(12) United States Patent
Hori

(10) Patent No.: US 12,556,823 B2
(45) Date of Patent: Feb. 17, 2026

(54) CAPTURE CONTROL APPARATUS, CAPTURE CONTROL METHOD, AND IMAGE CAPTURE SYSTEM

(71) Applicant: CANON KABUSHIKI KAISHA, Tokyo (JP)

(72) Inventor: Takuya Hori, Ibaraki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/813,565

(22) Filed: Aug. 23, 2024

(65) Prior Publication Data

US 2025/0088749 A1    Mar. 13, 2025

(30) Foreign Application Priority Data

Sep. 7, 2023    (JP) ................................ 2023-145576

(51) Int. Cl.
*H04N 23/695* (2023.01)
*H04N 23/62* (2023.01)
*H04N 23/90* (2023.01)

(52) U.S. Cl.
CPC ........... *H04N 23/695* (2023.01); *H04N 23/62* (2023.01); *H04N 23/90* (2023.01)

(58) Field of Classification Search
CPC ...... H04N 23/611; H04N 23/60; H04N 23/61; H04N 23/617; H04N 23/62; H04N 23/69; H04N 23/695; H04N 23/90
See application file for complete search history.

(56) References Cited

U.S. PATENT DOCUMENTS

| | | | |
|---|---|---|---|
| 7,777,783 B1* | 8/2010 | Chin | H04N 23/90 348/211.99 |
| 9,948,897 B2* | 4/2018 | Ono | G08B 13/19693 |
| 11,132,803 B2* | 9/2021 | Takahashi | H04N 23/60 |
| 2015/0116502 A1* | 4/2015 | Um | G06T 7/292 348/169 |
| 2024/0380967 A1* | 11/2024 | Nomura | H04N 23/60 |

FOREIGN PATENT DOCUMENTS

JP    2022045529 A    3/2022

* cited by examiner

*Primary Examiner* — Boubacar Abdou Tchoussou
(74) *Attorney, Agent, or Firm* — Cowan, Liebowitz & Latman, P.C.

(57) ABSTRACT

Disclosed is a capture control apparatus that determines a specific subject in a captured area as a tracking target subject and controls a capture direction of a camera so as to track and capture the tracking target subject. While a video captured by the camera is selected as a specific video by an external selection apparatus, capture control apparatus does not change the tracking target subject to be tracked by the camera.

17 Claims, 13 Drawing Sheets

FIG. 1
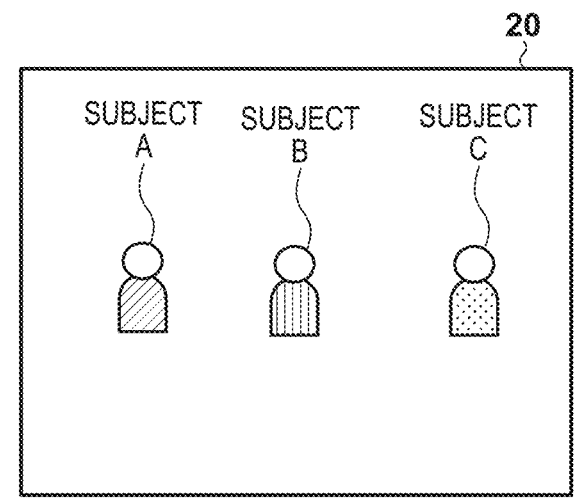
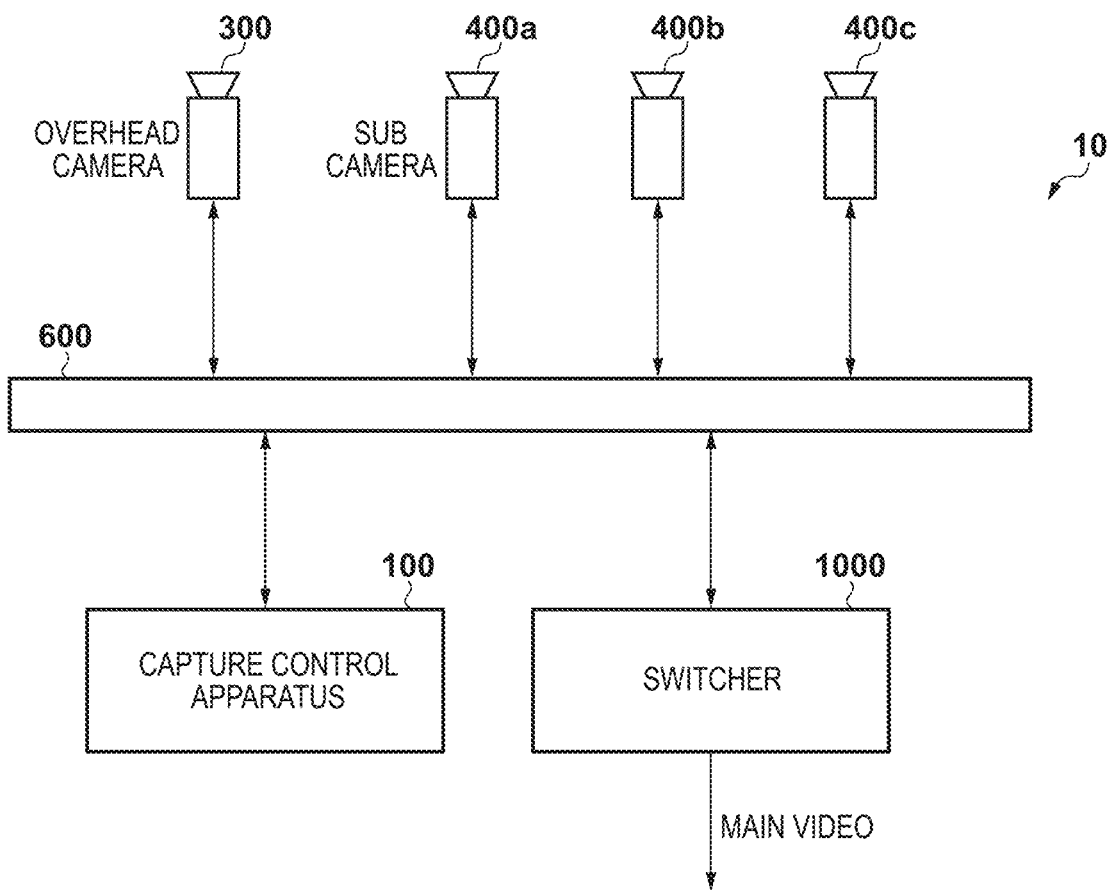

CAPTURED IMAGE OF OVERHEAD CAMERA 300
(OVERHEAD CAMERA COORDINATE SYSTEM)

BIRD VIEW OF CAPTURED AREA 20
(PLANAR COORDINATE SYSTEM)

CAPTURED IMAGE OF OVERHEAD CAMERA 300

VIEW IN WHICH COORDINATE TRANSFORMATION
HAS BEEN PERFORMED ON CAPTURED IMAGE
OF OVERHEAD CAMERA 300

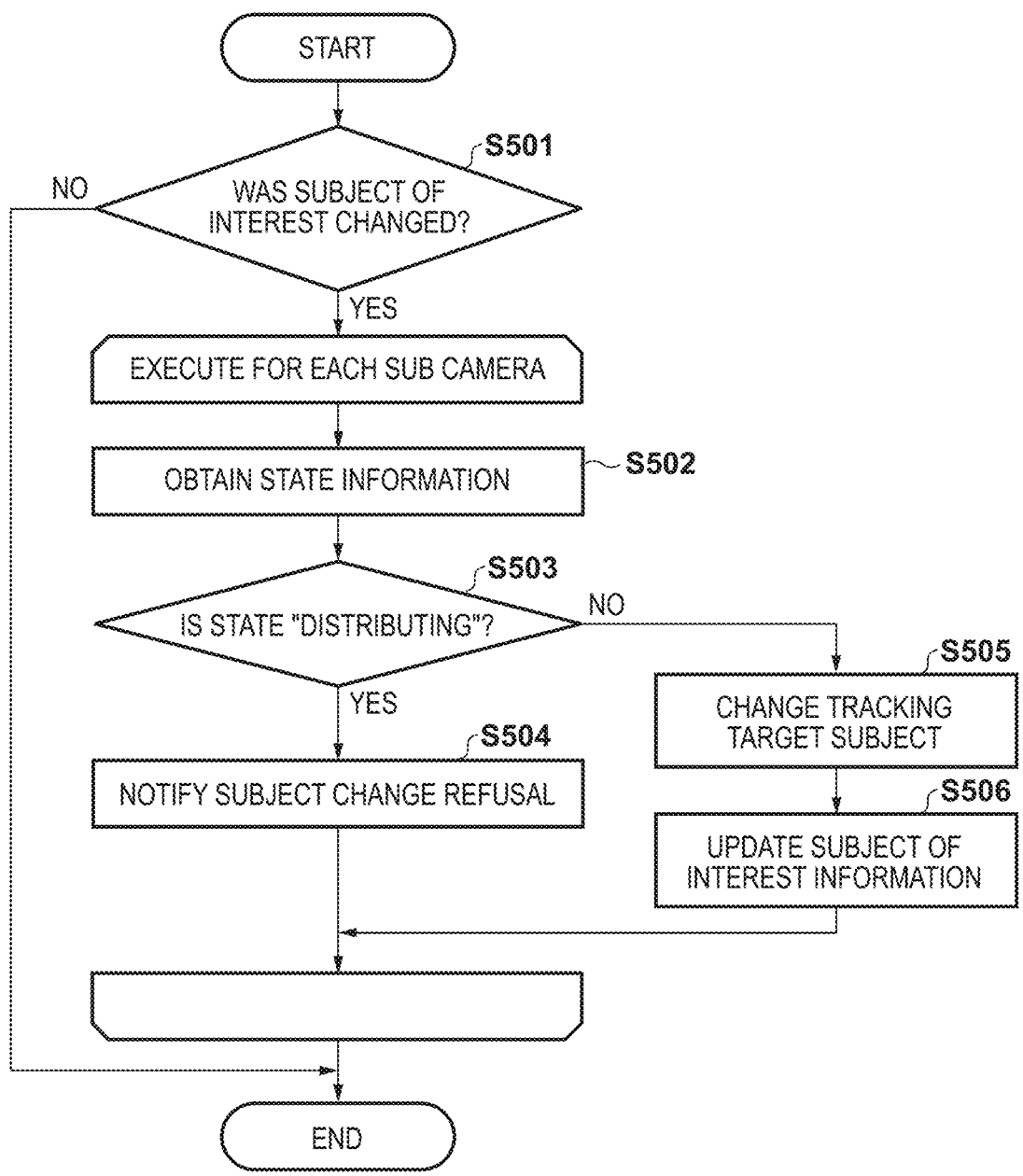

WHEN SUBJECT OF INTEREST AND TRACKING TARGET SUBJECT ARE SAME

WHEN STATE OF SUB CAMERA IS NOT "DISTRIBUTING"

WHEN STATE OF SUB CAMERA IS "DISTRIBUTING"

| ROLE | SUB CAMERA CONTROL | |
|---|---|---|
| | TRACKING TARGET SUBJECT | ZOOM |
| MAIN FOLLOW | SAME AS MAIN | IN-PHASE WITH MAIN |
| MAIN COUNTER | SAME AS MAIN | ANTIPHASE TO MAIN |
| ASSIST FOLLOW | DIFFERENT TO MAIN (LEFT SIDE) | IN-PHASE WITH MAIN |
| ASSIST COUNTER | DIFFERENT TO MAIN (LEFT SIDE) | ANTIPHASE TO MAIN |

CAPTURE CONTROL APPARATUS, CAPTURE CONTROL METHOD, AND IMAGE CAPTURE SYSTEM

BACKGROUND OF THE INVENTION

Field of the Invention

The present invention relates to a capture control apparatus, a capture control method, and an image capture system, and in particular to a technique to control a plurality of image capture apparatuses.

Description of the Related Art

In live distribution and recording, a multi-camera image capture system is used that dynamically selects or switches to a video to be used in broadcasting and recording (a main video), from among videos that have been captured by a plurality of cameras in parallel, with use of a video switcher, and outputs the video (Japanese Patent Laid-Open No. 2022-45529).

In such an image capture system, labor can be saved by introducing a capture control apparatus that performs centralized control on camera operations. For example, when the capture control apparatus automatically controls the operations of other cameras based on information obtained from one specific camera, diverse types of image capture can be performed even with a small number of people.

Meanwhile, it is necessary to devise a way to prevent the execution of automatic control that is against the intention of a user who dynamically selects a main video (an operator of the video switcher).

SUMMARY OF THE INVENTION

Accordingly, one aspect of the present invention provides a capture control apparatus and a capture control method that can suppress camera operations that are not intended by a user in a capture control apparatus that automatically controls the operations of a plurality of cameras.

According to an aspect of the present invention, there is provided a capture control apparatus, comprising: one or more processors that execute a program stored in a memory and thereby function as: a determination unit configured to determine a specific subject in a captured area as a tracking target subject; and a control unit configured to control a capture direction of a camera so as to track and capture the tracking target subject, wherein, while a video captured by the camera is selected as a specific video by an external selection apparatus, the determination unit does not change the tracking target subject to be tracked by the camera.

According to another aspect of the present invention, there is provided a capture control method executed by a capture control apparatus, the capture control method comprising: determining a specific subject in a captured area as a tracking target subject; and controlling a capture direction of a camera so as to track and capture the tracking target subject, wherein, while a video captured by the camera is selected as a specific video by an external selection apparatus, the determination includes making no change to the tracking target subject to be tracked by the camera.

According to a further aspect of the present invention, there is provided an image capture system, comprising: a capture control apparatus; one or more cameras whose image capture is controlled by the capture control apparatus; the selection apparatus; and a communication network via which the capture control apparatus, the cameras, and the selection apparatus are connected in a communication-enabled manner, wherein the capture control apparatus comprises: one or more processors that execute a program stored in a memory and thereby function as: a determination unit configured to determine a specific subject in a captured area as a tracking target subject; and a control unit configured to control a capture direction of each of the one or more cameras so as to track and capture the tracking target subject, wherein, while a video captured by a camera of the one or more cameras is selected as a specific video by an external selection apparatus, the determination unit does not change the tracking target subject to be tracked by the camera.

According to another aspect of the present invention, there is provided a non-transitory computer-readable medium storing a program for causing a computer to perform a capture control method comprising: determining a specific subject in a captured area as a tracking target subject; and controlling a capture direction of a camera so as to track and capture the tracking target subject, wherein, while a video captured by the camera is selected as a specific video by an external selection apparatus, the determination includes making no change to the tracking target subject to be tracked by the camera.

Further features of the present invention will become apparent from the following description of exemplary embodiments (with reference to the attached drawings).

BRIEF DESCRIPTION OF THE DRAWINGS

FIG. 1 is a schematic diagram of an image capture system according to an embodiment.

FIG. 9 is a flowchart related to the operations of the capture control apparatus according to a first embodiment.

DESCRIPTION OF THE EMBODIMENTS

Figure 2:
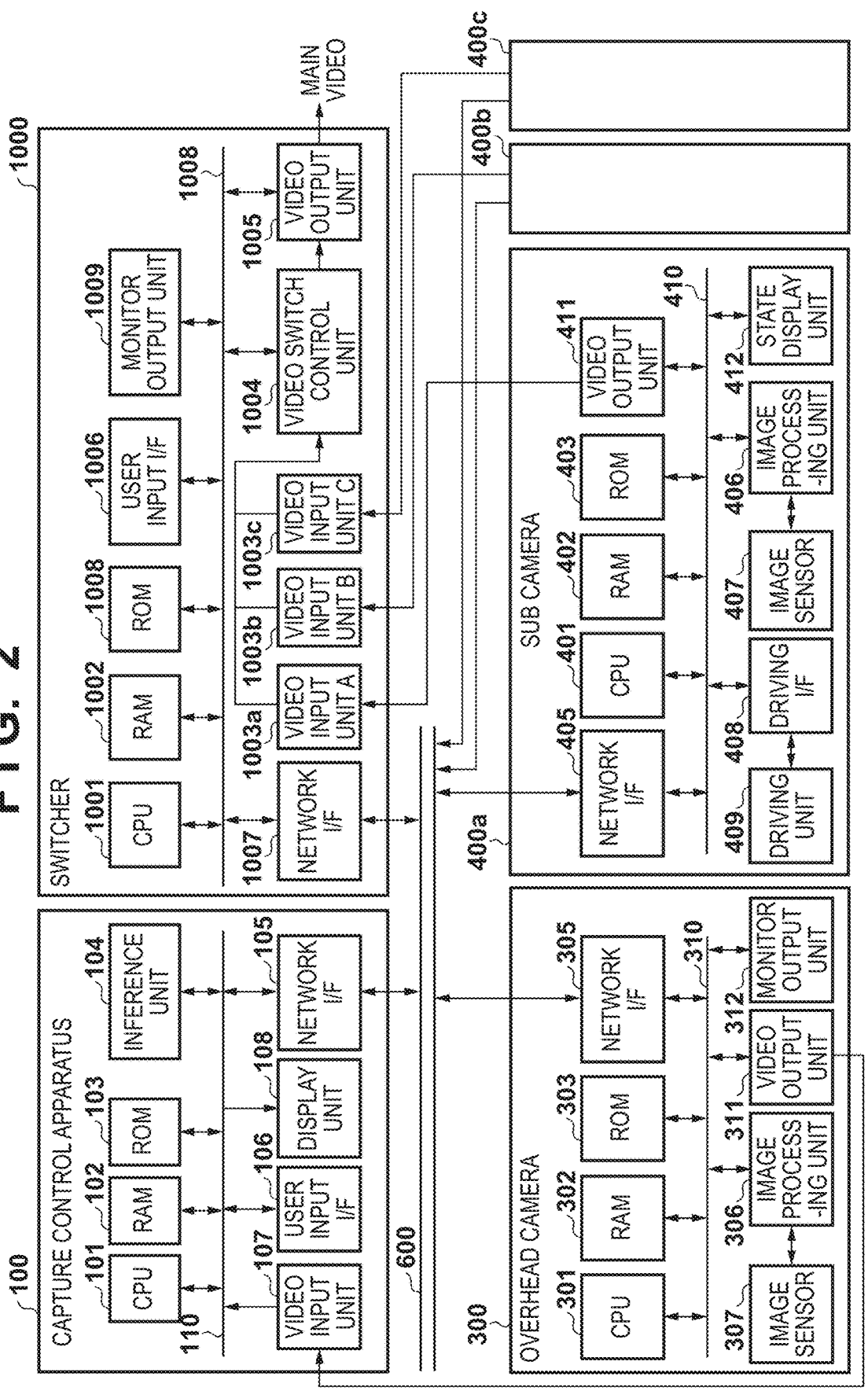
FIG. 2 is a block diagram showing an exemplary functional configuration of each apparatus in the image capture system according to an embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate.

Furthermore, in the attached drawings, the same reference numerals are given to the same or similar configurations, and redundant description thereof is omitted.

First Embodiment (Overview of Multi-Camera Image Capture System)

FIG. 1 is a schematic diagram showing an exemplary configuration of a multi-camera image capture system 10 (hereinafter simply referred to as an image capture system) according to the present embodiment. The image capture system 10 includes a plurality of cameras 300 and 400a to 400c, a capture control apparatus 100, and a video switcher (hereinafter simply referred to as a switcher) 1000. The plurality of cameras 300 and 400a to 400c, the capture control apparatus 100, and the switcher 1000 are connected in such a manner that they can perform communication via a communication network 600.

Here, an operator is present for the switcher 1000. Furthermore, an operator (user) may be present also for the capture control apparatus 100, but this operator is not indispensable. The operator of the switcher 1000 may be the user of the capture control apparatus 100. The sub cameras 400a to 400c do not require a photographer because image capture thereof is controlled by the capture control apparatus 100. The overhead camera 300 does not require a photographer, either.

The communication network 600 conforms with a known wired or wireless communication standard, such as the IEEE 802.3 series and the IEEE 802.11 series. Furthermore, each of the plurality of cameras 300 and 400a to 400c, the capture control apparatus 100, and the switcher 1000 include a communication interface that conforms with the standard of the communication network 600.

Although the illustration of FIG. 1 indicates that all signals are communicated via the communication network 600, for example, video signals and control signals may be communicated using different methods. For example, each of the plurality of cameras 300 and 400a to 400c may supply video signals directly to the capture control apparatus 100 or the switcher 1000 via a cable.

Among the plurality of cameras 300 and 400a to 400c, the camera 300 captures an entirety of a predetermined captured area 20. The captured area 20 is set as, for example, an area in which subjects to be captured can exist in a studio. Therefore, all of the subjects in the captured area are captured in a video of the camera 300.

The purpose of the camera 300 is to capture images for detecting subjects to be captured that exist in the captured area. Therefore, the capture direction and the angle of view of the camera 300 are determined in accordance with the position and the captured area 20 of the camera 300, and are basically fixed during image capture. Furthermore, it is desirable that the entirety of the captured area 20 be captured by the camera 300 without being hidden by an object outside the captured area 20. For this reason, here, the camera 300 is placed at a position where an overhead view of the entirety of the captured area 20 is attained. Hereinafter, the camera 300 will be referred to as an overhead camera for distinction from other cameras 400a to 400c whose capture directions and angles of view are not basically fixed during image capture. However, the position of placement of the camera 300 is not limited to a position where an overhead view of the captured area is attained. The operations of the overhead camera 300 can be controlled from the capture control apparatus 100.

The cameras 400a to 400c are, for example, PTZ cameras, and the operations thereof, including the capture directions (pan and tilt angles) and angles of view (zooming), can be controlled by the capture control apparatus 100. Also, the cameras 400a to 400c may be configured in such a manner that the capture directions (pan and tilt angles) thereof can be controlled by attaching camera bodies to camera platforms. Furthermore, the cameras 400a to 400c may be configured in such a manner that exchangeable lenses capable of zooming are mounted on the camera bodies. Hereinafter, the cameras 400a to 400c will be referred to as sub cameras. Also, hereinafter, the sub cameras 400a to 400c will be collectively referred to as sub cameras 400. The number of the sub cameras 400 is not limited to three; it may be equal to or smaller than two, or may be equal to or larger than four.

The switcher 1000 is a selection apparatus that receives video signals from each of the sub cameras 400a to 400c, selects a video from one sub camera designated by the user, and outputs the video as a main video.

The capture control apparatus 100 detects subjects from video signals received from the overhead camera 300. Based on the detection result, the capture control apparatus 100 determines subjects to be tracked by the respective sub cameras 400a to 400c. Then, the capture control apparatus 100 determines target capture directions (and also target angles of view, if necessary) of the respective sub cameras 400a to 400c so that the sub cameras 400a to 400c respectively capture the determined subjects. The capture control apparatus 100 transmits control commands including the determined target capture directions to the sub cameras 400a to 400c. The capture control apparatus 100 continuously executes the subject detection, the decision on target capture directions, and the transmission of control commands; in this way, each of the sub cameras 400a to 400c can be controlled so that it tracks and captures a specific subject.

(Exemplary Functional Configuration of Each Apparatus)

FIG. 2 is a block diagram showing an exemplary functional configuration of each device that composes a multi-camera image capture system shown in FIG. 1. Note that the constituents represented as functional blocks in the figure can be realized by an integrated circuit, such as an ASIC and an FPGA, a discrete circuit, or a combination of a memory and a processor that executes a program stored in the memory. Also, one functional block may be realized by a plurality of integrated circuit packages, or a plurality of functional blocks may be realized by one integrated circuit package. Furthermore, the same functional block may be implemented as different constituents depending on the operating environment, required capabilities, and so on.

(Capture Control Apparatus 100)

First, an exemplary functional configuration of the capture control apparatus 100 will be described. The capture control apparatus 100 may be, for example, a general-purpose computer device, such as a personal computer and a workstation. The capture control apparatus 100 is configured in such a manner that a CPU 101, a RAM 102, a ROM 103, an inference unit 104, a network interface (I/F) 105, a user input I/F 106, a video input unit 107, and a display unit 108 are connected to one another via an internal bus 110.

The CPU 101 is a microprocessor capable of executing programmed instructions. The CPU 101 realizes the functions of the capture control apparatus 100, which will be described later, by reading a program stored in the ROM 103 into the RAM 102 and executing the program, for example. The CPU 101 can realize the functions of the capture control apparatus 100 by, for example, executing a capture control application that operates on base software (OS).

The RAM 102 is used to load the program executed by the CPU 101, and to temporarily store data that is processed by the CPU 101, data that is currently processed, and so forth. Also, a part of the RAM 102 may be used as a video memory for the display unit 108.

The ROM 103 is a nonvolatile rewritable memory, and stores the program (OS and application) executed by the CPU 101, user data, and so forth.

The inference unit 104 executes processing for detecting subject regions using a machine learning model with respect to a video of the overhead camera 300. The inference unit 104 can be implemented using a hardware circuit that can execute computation of the machine learning model at high speed, such as a graphics processing unit (GPU) and a neural network processing unit (NPU), for example. Alternatively, the inference unit 104 may be implemented using a reconfigurable logic circuit, such as a field-programmable gate array (FPGA). The CPU 101 may realize the functions of the inference unit 104 by executing the program.

The machine learning model may be a convolutional neural network (CNN) that has been trained in accordance with the type of subjects to be detected. It is assumed here that the inference unit 104 detects human body regions or human face regions as subject regions from an input image. Also, it is assumed that the inference unit 104 outputs, for each detected subject region, the position and the size of a rectangular region in which the subject region is inscribed, and a detection reliability degree. Note that processing for detecting different types of subject regions may be executed with respect to the same input image using a plurality of types of machine learning models. Note that the inference unit 104 may execute processing for detecting subject regions using a known method that does not use a machine learning model. The inference unit 104 can detect subject regions using, for example, a method that uses local feature amounts, such as SIFT and SURF, a method that uses pattern matching, or the like.

The network I/F 105 is an interface for connecting the capture control apparatus 100 to the communication network 600. The capture control apparatus 100 (CPU 101) can communicate with external apparatuses in the communication network 600, such as the overhead camera 300, the sub cameras 400a to 400c, and the switcher 1000, via the network I/F 105. Note that the capture control apparatus 100 may communicate with external apparatuses via another non-illustrated communication interface (a USB, Bluetooth®, or the like).

In order to communicate with each apparatus (the overhead camera 300, the sub cameras 400a to 400c, and the switcher 1000) in the communication network 600, the CPU 101 obtains a network address of each apparatus at an arbitrary timing, and stores the same into the RAM 102. Furthermore, the CPU 101 also obtains information of each apparatus (the type, model name, and the like of the apparatus) at an arbitrary timing (e.g., at the time of first communication), and stores the same into the RAM 102. It is assumed that, as described above, the CPU 101 is aware of at least identification information and the types of apparatuses with respect to the overhead camera 300, the sub cameras 400a to 400c, and the switcher 1000. Note that the user may be allowed to give any name to each individual apparatus.

The user input I/F 106 is an interface for connecting an input device (not shown), such as a mouse, a keyboard, and a touch panel. The capture control apparatus 100 accepts a user instruction via the user input I/F 106.

The video input unit 107 is an input interface for video signals. The video input unit 107 may be a receiver that conforms with, for example, the serial digital interface (SDI) standard or the high-definition multimedia interface (HDMI®) standard. The video input unit 107 receives video signals from the overhead camera 300.

The display unit 108 is a display apparatus, such as a liquid crystal display (LCD). The display unit 108 displays a GUI screen provided by the OS, the capture control application, or the like.

(Switcher 1000)

Next, an exemplary functional configuration of the switcher 1000 will be described.

A CPU 1001 is a microprocessor capable of executing programmed instructions. The CPU 1001 controls the operations of each functional block and realizes the functions of the switcher 1000, which will be described later, by reading a program stored in a ROM 1008 into a RAM 1002 and executing the program, for example.

The RAM 1002 is used to load the program executed by the CPU 1001, and to temporarily store data that is processed by the CPU 1001, data that is currently processed, and so forth. Also, the RAM 1002 may be used as a buffer for video signals received from the sub cameras 400.

The ROM 1008 is a nonvolatile rewritable memory, and stores the program executed by the CPU 1001, setting values of the switcher 1000, user data, and so forth.

Video input units 1003a to 1003c are input interfaces for video signals. The video input units 1003a to 1003c may be receivers that conform with, for example, the SDI standard or the HDMI standard. The video input units 1003a, 1003b, and 1003c receive video signals from the sub cameras 400a, 400b, and 400c, respectively. Note, it is sufficient that the number of the video input units 1003 be equal to or larger than the number of the sub cameras 400.

FIG. 2 shows a configuration in which the video input units 1003 and the sub cameras 400 are connected in one-to-one correspondence. However, video signals from one or more of the sub cameras 400a to 400c may be supplied to the switcher 1000 via the communication network 600. In this case, the switcher 1000 receives the video signals via a network I/F 1007. Note that a sub camera 400 that supplies video signals to the video input unit 1003 and a sub camera 400 that supplies video signals via the communication network 600 may coexist.

A video switch control unit 1004 selects video signals selected via a user input I/F 1006 as a specific video from among a plurality of video signals that have been input to the video input units 1003a to 1003c. Here, the video switch control unit 1004 can select a main video and a preview video as the specific video. Also, the video switch control unit 1004 outputs the video signals selected as the main video to a video output unit 1005. The preview video is a video that is scheduled to be used as a main video next.

The video output unit 1005 is an interface that outputs the video signals selected by the video switch control unit 1004 to the outside (e.g., a live distribution device or a program recording apparatus). The video output unit 1005 may be a transmitter that conforms with, for example, the SDI standard or the HDMI standard.

A monitor output unit 1009 generates a video for a screen on which the video signals from the sub cameras 400a to 400c, which have been received via the video input unit 1003 or the network I/F 1007, are displayed in an aligned manner, and outputs the video to a non-illustrated external display apparatus. Furthermore, the monitor output unit 1009 also outputs a video for a setting screen of the switcher 1000 to the external display apparatus.

The user input I/F 1006 is, for example, an interface for connecting an input device (not shown), such as a button, a dial, a joystick, and a touch panel. The switcher 1000 accepts a user instruction related to selections of a main video and a preview video and settings of the switcher 1000 via the user input I/F 1006. The preview video is a video that is scheduled to be used as a main video next.

Based on the user instruction via the user input I/F 106, the CPU 1001 categorizes each of the states of the sub cameras 400a to 400c into one of the following: distributing, previewing, and standing by. Then, the CPU 1001 stores identification information pieces and the determined states of the respective sub cameras 400a to 400c into the RAM 1002 in association with each other. Hereinafter, information indicating the state of each sub camera will be referred to as camera state information STREAMING. The CPU 1001 updates camera state information pieces STREAMING, for example, each time the selected video signals have changed.

Specifically, the CPU 1001 determines that the state of a sub camera that is capturing a video currently output from the video output unit 1005 (a main video) is "distributing". Also, the CPU 1001 determines that the state of a sub camera that is capturing a preview video is "previewing". Furthermore, the CPU 1001 determines that the state of a sub camera that is capturing another video is "standing by". Identification information of a sub camera 400 may be any information that allows each individual sub camera to be identified, such as a unique name given by the user, a manufacturing number, and a network address.

Based on the camera state information pieces STREAMING, the CPU 1001 transmits control signals (tally information) for performing tally display to sub cameras that are distributing and previewing via the network I/F 1007.

The network I/F 1007 is an interface for connecting the switcher 1000 to the communication network 600. The switcher 1000 (CPU 1001) can communicate with external apparatuses in the communication network 600, such as the overhead camera 300, the sub cameras 400a to 400c, and the capture control apparatus 100, via the network I/F 1007. Note that the switcher 1000 may communicate with the external apparatuses via another non-illustrated communication interface (a USB, Bluetooth, or the like).

(Overhead Camera 300)

Next, an exemplary functional configuration of the overhead camera 300 will be described.

A CPU 301 is a microprocessor capable of executing programmed instructions. The CPU 301 controls the operations of each functional block and realizes the functions of the overhead camera 300, which will be described later, by reading a program stored in a ROM 303 into a RAM 302 and executing the program, for example.

The RAM 302 is used to load the program executed by the CPU 301, and to temporarily store data that is processed by the CPU 301, data that is currently processed, and so forth. Furthermore, the RAM 302 may be used as a buffer for video signals obtained through image capture.

The ROM 308 is a nonvolatile rewritable memory. The ROM 308 stores the program executed by the CPU 301, setting values of the overhead camera 300, user data, and so forth. Note that the ROM 308 can also be used as a recording destination of video signals. The ROM 308 may include a built-in memory and an attachable/removable memory card.

An image sensor 307 includes an image capture optical system and an image sensor. The image sensor may be a known CCD or CMOS color image sensor that includes, for example, color filters based on the primary-color Bayer arrangement. The image sensor includes a pixel array in which a plurality of pixels are two-dimensionally arrayed, and peripheral circuits for reading out signals from each pixel. Each pixel accumulates charges corresponding to the amount of incident light by way of photoelectric conversion. Signals with a voltage corresponding to the amount of charges accumulated in an exposure period are read out from each pixel; as a result, a group of pixel signals (analog image signals) representing a subject image formed on an image plane is obtained.

An image processing unit 306 applies predetermined signal processing and image processing to the analog image signals output from the image sensor 307, thereby generating signals and image data that suit an intended use, and obtaining and/or generating various types of information.

The processing applied by the image processing unit 306 can include, for example, preprocessing, color interpolation processing, correction processing, detection processing, data editing processing, evaluation value calculation processing, special effects processing, and so forth.

The preprocessing can include A/D conversion, signal amplification, reference level adjustment, defective pixel correction, and so forth.

The color interpolation processing is processing which is executed in a case where the image sensor 307 includes color filters, and in which the values of color components that are not included in the individual pieces of pixel data that compose image data are interpolated. The color interpolation processing is also called demosaicing processing.

The correction processing can include such processing as white balance adjustment, tone correction, correction of image deterioration caused by optical aberration of the image capture optical system (image recovery), correction of the influence of vignetting of the image capture optical system, and color correction.

The data editing processing can include such processing as cutout of a region (cropping), composition, scaling, encoding and decoding, and generation of header information (generation of a data file). The data editing processing also includes generation of video signals to be output to the switcher 1000, and video data to be recorded into the ROM 308.

The evaluation value calculation processing can include such processing as generation of signals and evaluation values used in automatic focus detection (AF), and generation of evaluation values used in automatic exposure control (AE). The CPU 301 executes AF and AE.

The special effects processing can include such processing as addition of blur effects, alteration of shades of colors, relighting, and so forth.

Note that these are examples of processing that can be applied by the image processing unit 306, and are not intended to limit processing applied by the image processing unit 306.

The image processing unit 306 outputs information and data that have been obtained or generated to the CPU 301, the RAM 302, a video output unit 311, and the like in accordance with an intended use.

Note that the types and settings of processing applied by the image processing unit 306 can be controlled by transmitting commands from the capture control apparatus 100 to the overhead camera 300.

A network I/F 305 is an interface for connecting the overhead camera 300 to the communication network 600. The overhead camera 300 (CPU 301) can communicate with external apparatuses in the communication network 600, such as the capture control apparatus 100, the switcher 1000, and the sub cameras 400a to 400c, via the network I/F 305. Note that the overhead camera 300 may communicate with external apparatuses via another non-illustrated communication interface (a USB, Bluetooth, or the like).

The video output unit 311 is an interface for outputting video signals that have been captured using the image sensor 307 to an external apparatus (here, the capture control apparatus 100). The video output unit 311 may be a transmitter that conforms with, for example, the SDI standard or the HDMI standard.

In a case where monitor output has been set to be enabled and a non-illustrated external display apparatus is connected to the overhead camera 300, a monitor output unit 312 generates a video for a screen that displays video signals obtained through image capture, and outputs the video to the external display apparatus.

(Sub Cameras 400)

Next, an exemplary functional configuration of the sub cameras 400a to 400c will be described. Note, it is assumed here that the sub cameras 400a to 400c have the same functional configuration, and the following describes an exemplary functional configuration of the sub camera 400a as a representative.

It is assumed that the functional blocks of the sub camera 400a and the overhead camera 300 with the same name have the same functions, and a description thereof is omitted. Note that a video output unit 411 outputs video signals to the switcher 1000.

As described above, the sub camera 400 is a PTZ camera, and its capture direction and angle of view can be controlled from outside. For this reason, the sub camera 400 includes a driving unit 409 capable of performing pan and tilt operations and a zoom operation, and a driving I/F 408. The driving I/F 408 is a communication interface between the driving unit 409 and a CPU 401.

The driving unit 409 includes a pan/tilt mechanism by which the sub camera 400 is supported so that it can be panned and tilted, a zoom mechanism that changes the angle of view of the image capture optical system, a motor that drives these mechanisms, and the like. Enlargement and reduction of images performed by an image processing unit 406 may be used in the zoom mechanism. The driving unit 409 drives the motor in accordance with instructions received from the CPU 401 via the driving I/F 408, and adjusts the optical axis direction and the angle of view of the image capture optical system.

Also, a state display unit 412 is a so-called tally lamp. It is assumed here that the state display unit 412 includes red and green LEDs. Regarding the two LEDs of the state display unit 412, none of them is lit, or only one of them is lit; both of them are not lit together. The CPU 401 controls display of the state display unit 412 based on tally information received from the capture control apparatus 100. Here, the CPU 401 controls the state display unit 412 so that the red LED is lit in a case where the received tally information indicates "distributing", and the green LED is lit in a case where the received tally information indicates "previewing". Furthermore, the CPU 401 controls the state display unit 412 so that the red and green LEDs are not lit in a case where the received tally information indicates "standing by".

Note that the number of LEDs included in the state display unit 412 may be one, or may be three or more. Also, regarding the colors thereof, any colors may be used as long as two or more LEDs do not have the same color. Note that the relationship between tally information and the display state of the state display unit 412 should be unified in all of the sub cameras 400.

<Description of Operations of Each Apparatus>

Next, using FIG. 3 and FIGS. 4A to 4D, the following describes the operations of each apparatus in a case where the capture control apparatus 100 automatically controls capture operations of the sub cameras 400a to 400c based on a video of the overhead camera 300 in the multi-camera image capture system.

Figure 3:
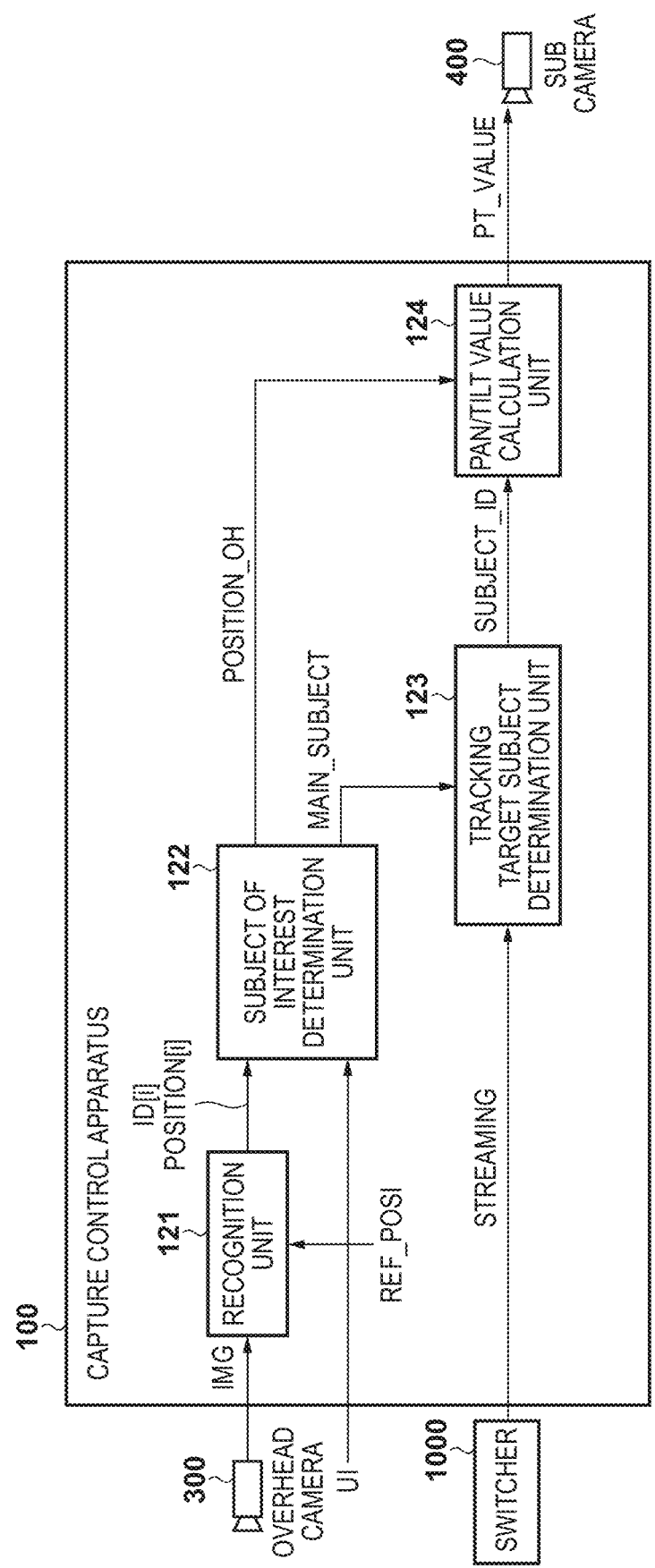
FIG. 3 is a diagram showing a capture control apparatus according to an embodiment, with a focus on main operations and flows of signals.

FIG. 3 is a diagram showing a processing sequence that is performed when the capture control apparatus 100 controls the operations of the sub cameras 400a to 400c, with a focus on main operations and flows of signals. The functional blocks shown in the capture control apparatus 100 schematically indicate the main operations, and are equivalent to the main functions provided by the capture control application. Each functional block of FIG. 3 is realized by a combination of the CPU 101, which executes the capture control application, and one or more of the functional blocks of the capture control apparatus 100 shown in FIG. 2.

Also, FIG. 4A to FIG. 4D are flowcharts related to the operations of the capture control apparatus 100, the overhead camera 300, the sub cameras 400, and the switcher 1000, respectively. As the operations of the sub cameras 400a to 400c are basically the same, they will be described collectively.

In the following description, it is assumed that the capture control apparatus 100 is aware of the three-dimensional coordinate value of the viewpoint position of the overhead camera 300 and the capture direction (the optical axis direction) thereof. Furthermore, it is assumed that known position information, such as the three-dimensional coordinate values of the viewpoint positions of the sub cameras 400a to 400c, and the coordinate values of markers placed in the captured area 20, is stored in advance as predetermined position information REF_POSI in the ROM 103. Note, it is assumed that the coordinate system of a position is determined in advance in accordance with the type of the position.

(Operations of Capture Control Apparatus 100)

First, the operations of the capture control apparatus 100 will be described with reference to FIG. 3 and FIG. 4A. The operations described below are realized by the CPU 101 executing the capture control application.

In step S101, the CPU 101 transmits a capture instruction command to the overhead camera 300 via the network I/F 105 using a predetermined protocol. In response to this command, the overhead camera 300 starts to supply video signals (moving image data) IMG to the video input unit 107. The CPU 101 starts to store the video signals received by the video input unit 107 into the RAM 102, and then executes step S102.

In step S102, the recognition unit 121 executes the following processing.
(1) Apply processing for detecting subject regions to an input frame image, and store the detection results.
(2) For each of the detected subject regions, apply coordinate transformation to position information (image coordinates).
(3) For each of the detected subject regions, apply identification processing and specify identification information (in the case of a new subject, add information for identification processing).

(4) For each of the detected subject regions, store identification information ID[n] and position information POSITION[n] in association with each other.

The recognition unit 121 is realized mainly by the CPU 101 and the inference unit 104. The CPU 101 reads out, from the RAM 102, one frame of the video received from the overhead camera 300, and inputs the frame to the inference unit 104.

The following describes the operations of the recognition unit 121 in order.

(1) First, the inference unit 104 inputs the frame image to the machine learning model, and detects subject regions. The inference unit 104 stores the positions and the sizes of the respective subject regions that have been detected and the detection reliability degrees thereof, which have been output by the machine learning model as detection results, into the RAM 102. A position and a size of a subject region may be any information that allows a position and a size of a rectangular region in which the subject region is inscribed to be specified. Here, the central coordinates of the lower edge of the rectangular region, and the width and the height of the rectangular region, are used as the position and the size of the subject region.

Also, the inference unit 104 stores the detection results for the first frame image into the RAM 102 in association with identification information pieces ID[n] of subjects. Here, n is a subject number, and is an integer that takes a value from one to the total number of detected subject regions. Furthermore, the inference unit 104 stores the subject regions detected from the first frame image as templates for identifying the individual subjects into the RAM 102 in association with the identification information pieces ID[n] of the subjects. In a case where template matching is not used in identification of subjects, the templates may not be stored.

Figure 5A:
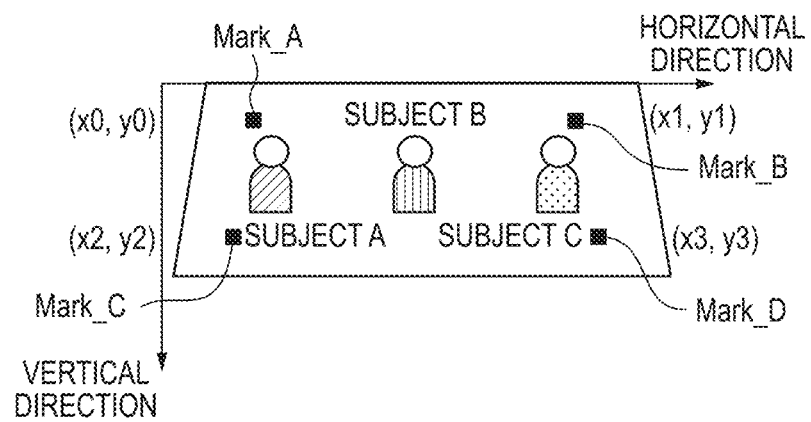
FIGS. 5A and 5B are diagrams illustrating a coordinate transformation according to an embodiment.
Figure 6A:
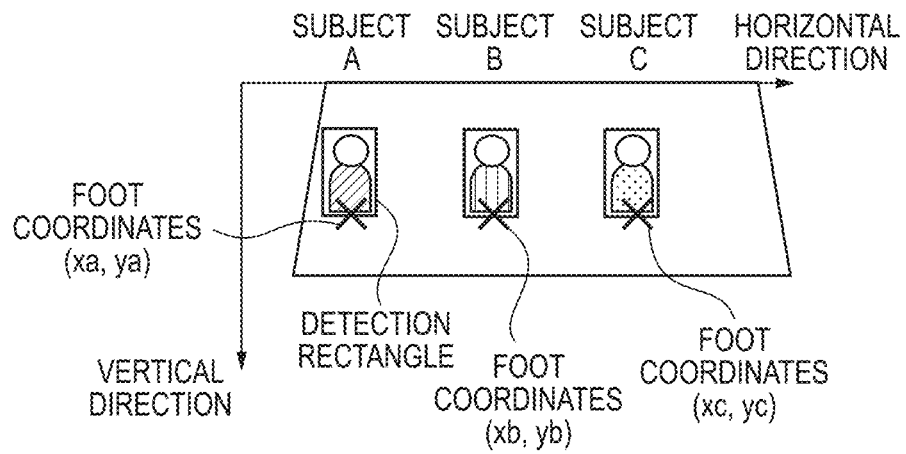
FIGS. 6A and 6B are diagrams related to subject detection and a coordinate transformation according to an embodiment.

FIG. 6A shows examples of the results of subject detection processing that has been executed by the inference unit 104 with respect to a video of the overhead camera 300 shown in FIG. 5A. Here, the regions of human subjects A to C, who are present in a captured area 20, are detected, and the coordinates of the centers of the lower edges of rectangular regions in which the subject regions are inscribed (foot coordinates) are output as positions.

Figure 5B:
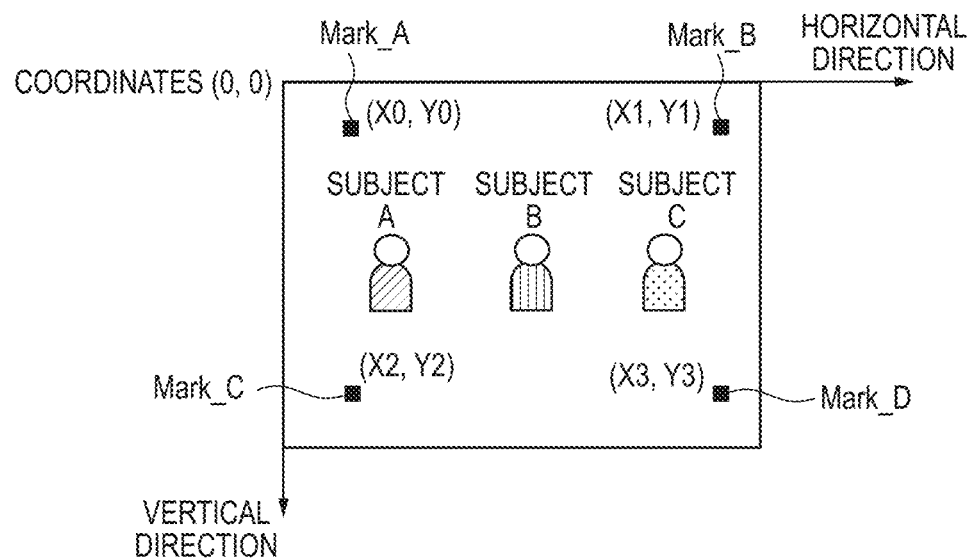

Note, for example, in a case where markers (Marks) are placed at known positions in the captured area 20 as shown in FIG. 5B for the purpose of later-described coordinate transformation, the CPU 101 detects images of the markers included in the frame image (FIG. 5A), and stores the positions thereof into the RAM 102. The inference unit 104 may be configured to execute the detection of marker images as well. The detection of marker images can be carried out using any known method, such as pattern matching that uses marker templates. Marker images may be detected using a pre-stored machine learning model intended for marker detection.

(2) Next, the coordinate transformation executed by the inference unit 104 will be described. FIG. 5A schematically shows a video of the overhead camera 300, and FIG. 5B schematically shows a state where the captured area 20 is viewed from directly above the center thereof. The inference unit 104 transforms the coordinates of the positions of the subject regions in a coordinate system of the overhead camera into the values of a coordinate system (planar coordinate system) of a case where the captured area 20 is viewed from directly above the center thereof.

Here, the reason why the coordinates are transformed into the values of the planar coordinate system is because the coordinate transformation is convenient for calculation of pan values for causing the sub cameras 400a to 400c to capture a specific subject (angles of movement on a horizontal plane). Note that the present description is provided on the premise that each sub camera 400 is placed so that the driving unit 409 performs a pan operation on a horizontal plane parallel to the floor of the captured area 20.

The coordinate transformation can be executed using a variety of methods; here, markers are placed at a plurality of known positions on the floor of the captured area 20, and the coordinates of the overhead camera coordinate system are transformed into the coordinates of the planar coordinate system based on the marker positions in the video obtained from the overhead camera 300. Note that the coordinate transformation may be performed with use of, for example, the viewpoint position and the capture direction of the overhead camera 300, without using markers.

The coordinate transformation can be executed using a homography transformation matrix H in accordance with the following formula 1.

$$\begin{pmatrix} X \\ Y \\ W \end{pmatrix} = H \begin{pmatrix} x \\ y \\ 1 \end{pmatrix} \quad \text{(formula 1)}$$

In formula 1, x and y on the right side are the horizontal coordinate and the vertical coordinate in the overhead camera coordinate system, whereas X and Y on the left side are the horizontal coordinate and the vertical coordinate in the planar coordinate system.

The homography transformation matrix can be calculated by solving simultaneous equations by assigning the coordinates of the four markers detected from the video and the (known) coordinates of the four markers placed in the captured area 20 in formula 1. In a case where the positional relationship between the captured area 20 and the overhead camera 300 is fixed, the homography transformation matrix H can be calculated in advance at the time of test image capture and stored into the ROM 103, for example.

Figure 6B:
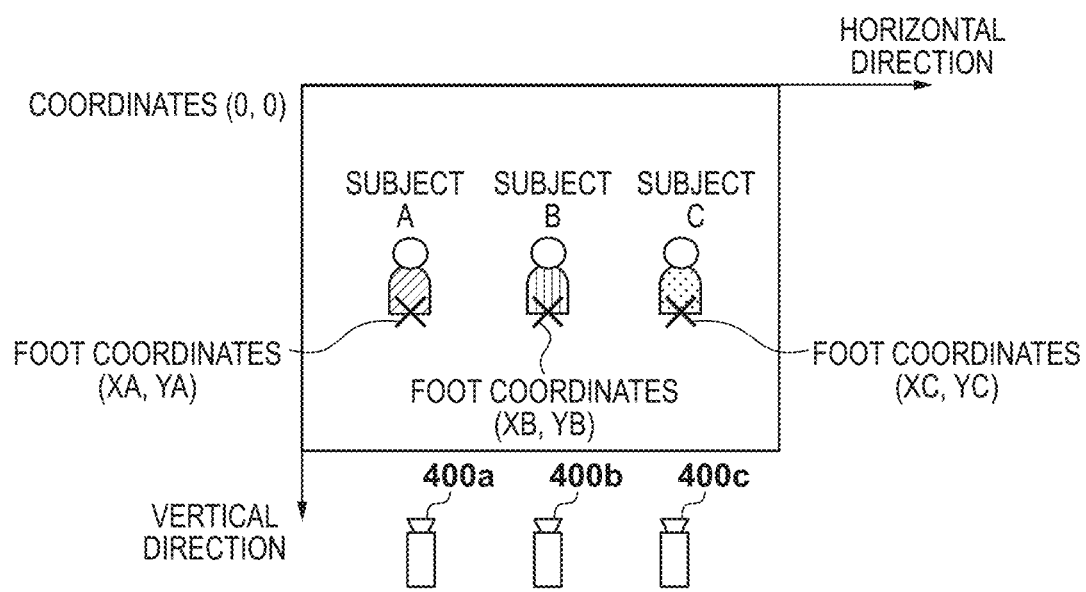

The CPU 101 sequentially reads out the positions of the subject regions from the RAM 102, and transforms the coordinates thereof into the values of the planar coordinate system. FIG. 6B schematically shows a state where the foot coordinates (x, y) of each subject region detected from the video of the overhead camera 300 shown in FIG. 6A have been transformed into the coordinate values (X, Y) of the planar coordinate system with use of formula 1 and the homography transformation matrix H stored in the ROM 103. The CPU 101 stores the foot coordinates obtained through the coordinate transformation as POSITION[n] into the RAM 102.

(3) Next, a description is given of an operation of the inference unit 104 to specify the identification information pieces ID[n] of the subjects. It is assumed here that the subjects are identified using template matching. Subject identification is carried out with respect to the results of subject detection processing that has been executed for the second time onward. With respect to the results of processing that has been executed for the first time, it is sufficient to newly assign identification information pieces ID[n] to the subject regions.

The inference unit 104 specifies identification information pieces ID[n] of the detected subject regions by way of template matching that uses templates stored in the RAM 102. As a result, the subjects in the captured area are identified. For example, for each of the detected subject regions, the inference unit 104 calculates evaluation values indicating correlations with the individual templates. Then, the inference unit 104 specifies identification information ID[n] corresponding to a template with which it has a correlation equal to or larger than a certain level and it has the highest correlation as identification information ID[n] of the subject region. For example, a known value, such as the sum of absolute differences between pixel values, can be used as an evaluation value.

Note, with respect to a subject region that does not have a correlation equal to or larger than the certain level with any template, the inference unit 104 assigns new identification information ID[n] and adds an image of the subject region as a template.

Also, the inference unit 104 may update existing templates using the subject regions that have been detected in the latest frame image, and may delete a template if a subject region that has a correlation equal to or larger than the certain level therewith does not exist for a certain period. Furthermore, the inference unit 104 may store templates corresponding to identification information pieces ID[n] that frequently appear into the ROM 103.

Note that the subjects may be identified using a method other than template matching. For example, the same identification information ID[n] may be specified for a subject region that is closest, in terms of at least one of the detected position and the size, to an immediately-preceding subject region. Also, a position in the current frame image may be predicted using a Kalman filter or the like based on positional transitions in the plurality of past detection results associated with the same identification information, and the same identification information ID may be specified for a subject region that is closest to the predicted position. Furthermore, these methods may be combined. When template matching is not used, the accuracy of identification of different subjects with similar appearances can be increased.

(4) The inference unit 104 stores the specified identification information pieces ID[n] and the positions (planar coordinate system) POSITION[n] of the corresponding subject regions into the RAM 102 in association with each other.

Note that among the processing of (1) to (4), processing other than the subject detection may be executed by the CPU 101 in place of the inference unit 104.

Here, the identification information pieces ID[n] and the positions POSITION[n] related to the subjects in the captured area 20 are obtained using the video of the overhead camera 300. However, videos of the sub cameras 400 may be used. In this case, the CPU 101 executes the operations shown in the flowchart of FIG. 4A for each sub camera. The positions of subject regions are output as values of a coordinate system of each sub camera 400. In this way, the overhead camera 300 is not indispensable, but it is considered that the accuracy of subject detection is higher when the overhead camera 300 is used.

Figure 4A:
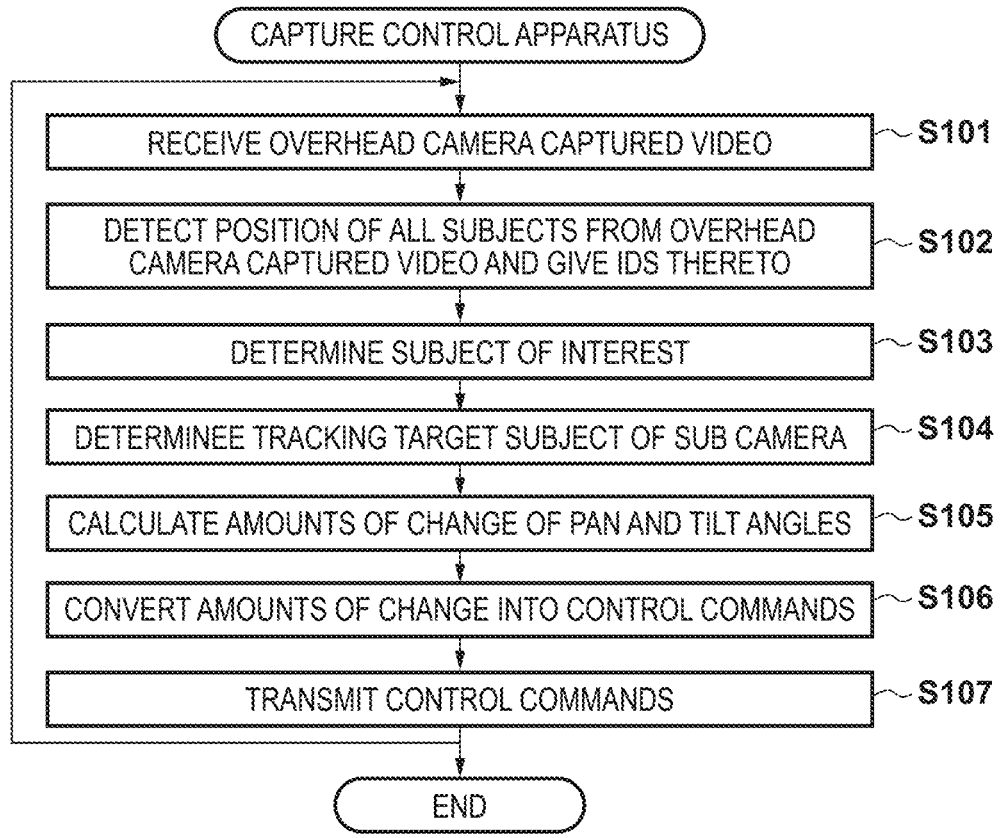
FIGS. 4A to 4D are flowcharts related to the operations of each apparatus in the image capture system according to an embodiment.

Returning to the description of FIG. 4A, in step S103, the CPU 101 as a subject of interest determination unit 122 of FIG. 3 determines a subject of interest. The CPU 101 can determine a subject designated by the user, or a subject selected based on a predetermined condition, as the subject of interest.

In a case where the user selects the subject of interest, the CPU 101 causes the display unit 108 or an external display apparatus to display the frame image to which the subject detection processing has been applied in step S102, together with indicators that indicate detected subject regions. The indicators may be, for example, rectangular frames indicating the outer edges of the subject regions shown in FIG. 6A, or may be other indicators. Furthermore, the CPU 101 may cause the display unit 108 to also display, for example, a message for encouraging a selection of a subject of interest in the image.

The user can select a subject region corresponding to a desired subject of interest by operating an input device connected to the user input I/F 106. The selection method is not limited in particular, but may be an operation of designating a desired subject region by operating a mouse or a keyboard.

Upon detecting a user operation for designating one of the subject regions, the CPU 101 stores the identification information ID[n] corresponding to the designated subject region as identification information MAIN_SUBJECT of the subject of interest into the RAM 102. Alternatively, the CPU 101 automatically stores identification information corresponding to one subject region that matches a predetermined condition as identification information of the subject of interest into the RAM 102. For example, the CPU 101 stores identification information ID[n] that corresponds to a subject region closest to the center of the screen, or a subject region that is largest in size among subject regions that are located at a distance of a threshold or smaller from the center of the screen, as identification information MAIN_SUBJECT into the RAM 102.

Alternatively, the CPU 101 may determine a subject captured by one predetermined camera among the sub cameras 400a to 400c as the subject of interest. In this case, a video from one predetermined sub camera is supplied to the capture control apparatus 100 via the communication network 600 or via the video input unit 107.

Also, the CPU 101 stores position information POSITION_OH corresponding to the identification information MAIN_SUBJECT of the tracking target subject into the RAM 102.

Thereafter, the CPU 101 executes step S104. In step S104, the CPU 101 as a tracking target subject determination unit 123 of FIG. 3 determines the subjects to be tracked and captured by the respective sub cameras 400a to 400c.

It is assumed here that every sub camera is to track and capture the subject of interest. Therefore, the CPU 101 sets the identification information MAIN_SUBJECT of the subject of interest, which has been determined in step S103, as identification information SUBJECT_ID of the tracking target subject.

Note that there may be a sub camera that captures a subject other than the subject of interest. For example, in a case where three subjects are present in the captured area 20 as shown in FIG. 6B, different tracking target subjects may be determined for the sub cameras 400a to 400c, respectively.

The CPU 101 writes the identification information SUBJECT_ID of the determined tracking target subject to the RAM 102. In a case where the tracking target subject can differ among the sub cameras, the CPU 101 stores the identification information pieces SUBJECT_ID of the tracking target subjects in association with the identification information pieces of the sub cameras. Note that in a case where the tracking target subject has changed, the CPU 101 keeps holding information of the previous tracking target subject in the RAM 102 without deleting the same.

Next, in step S105, the CPU 101 as a pan/tilt calculation unit 124 calculates the amounts of changes in the pan angle and the tilt angle that are necessary for the sub cameras to track and capture the tracking target subject that has been determined in step S104.

It is assumed here that the following information is stored in advance as predetermined position information REF_POSI in the ROM 103 for each of the sub cameras 400a to 400c.

Three-dimensional coordinates of the position of placement (a value in the planar coordinate system)

A capture direction corresponding to the initial values of the pan angle and the tilt angle of the driving unit Range in which the pan and tilt angles can be controlled The CPU 101 reads out the position information POSITION_OH corresponding to the identification information SUBJECT_ID of the tracking target subject from the RAM 102. Then, the CPU 101 first determines the pan angles from the position information POSITION_OH and the positions of placement of the sub cameras.

Figure 7:
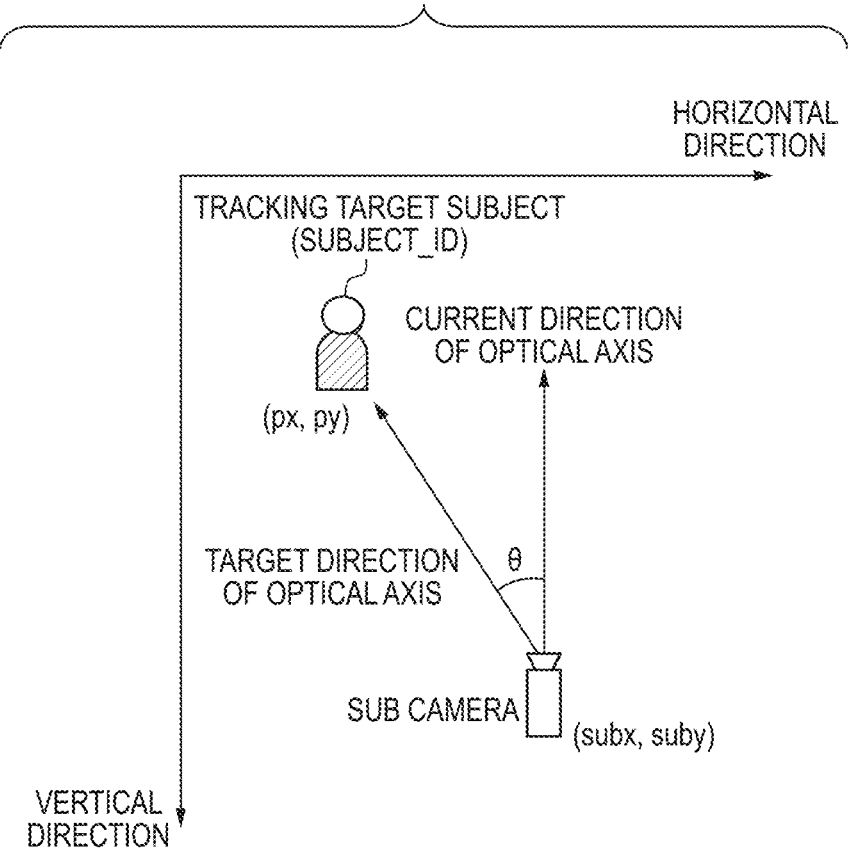
FIG. 7 is a diagram illustrating calculation of a pan value according to an embodiment.

FIG. 7 is a diagram showing an example of a positional relationship between one sub camera and the tracking target subject in the planar coordinate system. It is assumed here that a pan angle θ for pointing the optical axis direction of the sub camera at the subject position is determined. The CPU 101 calculates the pan angle θ using the following formula 2.

$$\theta = \tan^{-1} \frac{px - subx}{py - suby} \text{(rad)} \quad \text{(formula 2)}$$

In formula 2, px and py are the horizontal coordinate and the vertical coordinate of the position information POSITION_OH corresponding to the identification information SUBJECT_ID of the tracking target subject. Also, subx and suby are the horizontal coordinate and the vertical coordinate of the position of placement of the sub camera. It is assumed here that the current pan angle is the initial value 0°, and the optical axis direction is the vertical direction (Y-axis direction). In a case where the current optical axis direction is not the vertical direction, it is sufficient to reflect the angle difference between the current optical axis direction and the vertical direction in the angle obtained from formula 2. Furthermore, the pan direction is the counterclockwise direction if subx>px, and the clockwise direction if subx<px.

Figure 8:
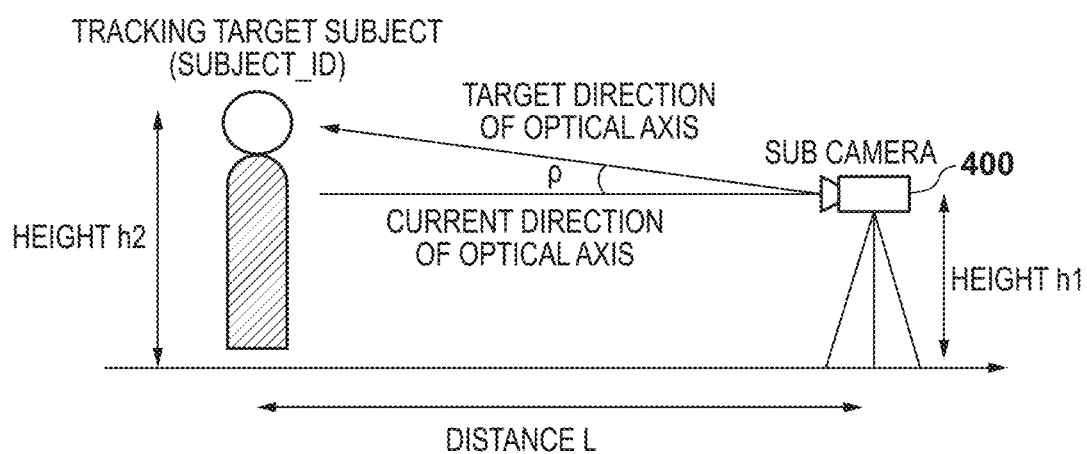
FIG. 8 is a diagram illustrating calculation of a tilt value according to an embodiment.

Next, the method of determining on the tilt angle will be described using FIG. 8. FIG. 8 shows a state where a sub camera and the tracking target subject are viewed from the side. It is assumed that the current optical axis of the sub camera 400 extends in the horizontal direction, the height thereof is h1, and the face of the tracking target subject at which the optical axis is to be pointed is at a height of h2. It is assumed that the angle difference in the height direction between the current optical axis direction and a target optical axis direction (the tilt angle) is ρ. The CPU 101 calculates the tilt angle ρ using the following formula 3 and formula 4.

$$L = \sqrt{(px - subx)^2 + (py - suby)^2} \quad \text{(formula 3)}$$

$$\rho = \tan^{-1} \frac{h2 - h1}{L} \text{(rad)} \quad \text{(formula 4)}$$

The coordinate values used in formula 4 are the same as the coordinate values used in formula 2. It is assumed that h1 and h2 are input to the capture control application and stored into the RAM 102 in advance. In this case, identification numbers that are associated with h2 of the respective subjects are set to be the same as identification numbers assigned in the subject detection processing. Alternatively, a value that has been measured in real time using a non-illustrated sensor may be used as h2.

It is assumed here that the current tilt angle is the initial value 0°, and the optical axis direction is the horizontal direction (the heights are constant). In a case where the current optical axis direction is not the horizontal direction, it is sufficient to reflect the angle difference between the current optical axis direction and the horizontal direction in the angle obtained from formula 4. Furthermore, the tilt direction is a downward direction if h1>h2, and an upward direction if h1<h2.

The CPU 101 cyclically communicates with each sub camera 400 via the communication network 600, obtains the current optical axis directions (the pan angles and the tilt angles of the driving units), and stores them into the RAM 102. Note that the communication cycle can be, for example, equal to or smaller than the reciprocal of the frame rate. Alternatively, for each sub camera 400, the CPU 101 may hold the value of the sum total of the pan angles and the tilt angles that have been controlled from the initial state in the RAM 102, and use this value as the current optical axis direction.

The CPU 101 calculates the amounts of changes in the pan angle and the tilt angle of each sub camera 400 in the foregoing manner, and stores them into the RAM 102.

The amounts of changes in the pan angle and the tilt angle may be an angular velocity for causing a sub camera 400 to turn to the direction of the tracking target subject. For example, the CPU 101 obtains the current pan angle and tilt angle from each sub camera 400 via the communication network 600. Then, the CPU 101 obtains a pan angular velocity proportional to the difference between the pan angle θ that has been read out from the RAM 102 and the current pan angle. Also, the CPU 101 obtains a tilt angular velocity proportional to the difference between the tilt angle ρ that has been read out from the RAM 102 and the current tilt angle. The CPU 101 stores the angular velocities calculated in the foregoing manner into the RAM 102.

Note that the amounts of changes in the pan angle and the tilt angle may be calculated using a video of a sub camera 400 instead of a video of the overhead camera 300. In this case, the CPU 101 may calculate the amount of change in the pan angle from the difference in the horizontal direction between the current optical axis direction and the direction of the tracking target subject in the coordinate system of the sub camera 400, and calculate the amount of change in the tilt angle from the difference in the vertical direction therebetween. Furthermore, in the image capture system, changing of the capture direction for tracking and capturing the tracking target subject may be performed only in one of the pan direction and the tilt direction; in such an image capture system, only the amount of change in one of the pan angle and the tilt angle may be calculated.

Next, in step S106, the CPU 101 reads out, from the RAM 102, the amounts of changes in the pan and tilt angles that have been calculated in step S105. Then, with respect to each individual sub camera, the CPU 101 generates a control command PT_VALUE for instructing the sub camera to make changes equivalent to these amounts of changes to the pan angle and the tilt angle. It is assumed that the format of the control commands has been determined in advance. The CPU 101 stores the generated control commands PT_VALUE into the RAM 102.

Next, in step S107, the CPU 101 reads out the control commands PT_VALUE generated in step S106 from the RAM 102, and transmits them to the communication network 600 via the network I/F 105. The sub cameras 400a to 400c receive the control commands PT_VALUE addressed to themselves via network I/Fs 405.

The CPU 101 executes the processing from step S101 with respect to the next frame image in the video of the overhead camera 300. Note that the processing shown in FIG. 4A need not necessary be executed on a per-frame basis.

(Operations of Overhead Camera 300)

Figure 4B:
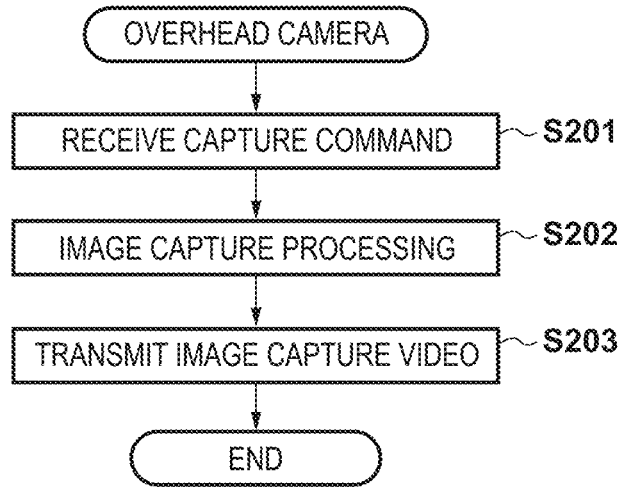

Next, the operations of the overhead camera 300 will be described with reference to FIG. 4B. The operations described below are realized by the CPU 301 executing the program.

When the power of the overhead camera 300 has been turned on, the CPU 301 initializes each functional block, and then a capture standby state begins. In the capture standby state, the CPU 301 starts moving image capture processing for live-view display. Image data for display generated by the image processing unit 306 is output via the monitor output unit 312.

In the capture standby state, the CPU 301 waits for reception of a control command via the network I/F 305. Upon receiving a control command, the CPU 301 executes operations corresponding to the control command. The following describes operations for a case where a capture command has been received as the control command from the capture control apparatus 100.

In step S201, the CPU 301 receives a capture command from the capture control apparatus 100 via the network I/F 305.

Note that in the capture command, such capture parameters as the frame rate and the resolution may be designated. Furthermore, the capture command may include settings related to processing applied by the image processing unit 306.

In S202, in response to the reception of the capture command, the CPU 301 starts processing for capturing moving images to be supplied to the capture control apparatus 100. In this moving image capture processing, moving images that have higher image quality than those of the moving image capture processing for live-view display are captured. For example, the captured moving images are higher in at least one of the moving image resolution and the capture frame rate than moving images for live-view display. The image processing unit 306 applies processing to the images based on settings for the moving images to be supplied to the capture control apparatus 100. The image processing unit 306 sequentially stores the generated pieces of moving image data into the RAM 302.

In step S203, the CPU 101 reads out the pieces of moving image data from the RAM 302, and supplies them as video signals from the video output unit 311 to the video input unit 107 of the capture control apparatus 100.

From then on, processing from the image capture to the supply of video signals is continued until a control command for stopping the image capture is received.

(Operations of Sub Cameras 400)

Figure 4C:
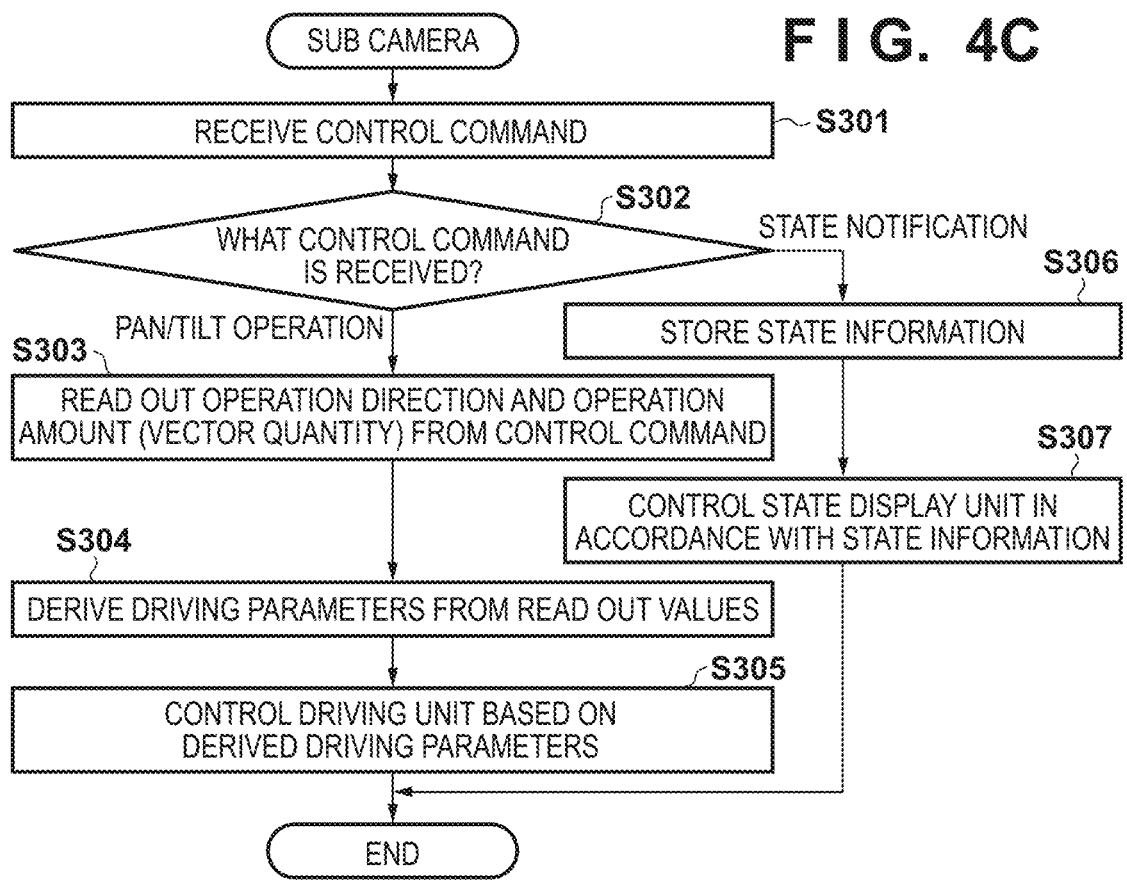

Next, the operations of a sub camera 400 will be described with reference to FIG. 4C. The operations described below are realized by the CPU 401 executing the program. Note that as the sub cameras 400a to 400c execute the same operations, the following will be described as the operations of the sub cameras 400.

When the power of the sub camera 400 has been turned on, the CPU 401 initializes each functional block, and then starts processing for capturing moving images to be supplied to the switcher 1000. The image processing unit 406 applies, to analog image signals obtained from an image sensor 407, processing based on settings for the moving images to be supplied to the switcher 1000. The image processing unit 406 sequentially stores the generated pieces of moving image data into the RAM 402. The CPU 401 reads out the pieces of moving image data from the RAM 402, and supplies them as video signals from the video output unit 411 to the video input unit 1003 of the switcher 1000.

While supplying the video signals to the switcher 1000, the CPU 401 waits for reception of a control command via the network I/F 305. Upon receiving a control command, the CPU 401 executes operations corresponding to the control command. The following describes operations for a case where a pan/tilt operation command from the capture control apparatus 100, or a state notification command from the switcher 1000, has been received as a control command.

In step S301, the CPU 401 receives the control command from the capture control apparatus 100 or the switcher 1000 via the network I/F 405.

In step S302, the CPU 401 determines whether the received control command is a pan/tilt operation command or a state notification command. The CPU 401 executes step S303 if it has been determined that the control command is the pan/tilt operation command, and executes step S306 if it has been determined that the control command is the state notification command. A description of operations corresponding to other control commands is omitted.

In step S303, the CPU 401 reads out an operation direction (the direction(s) of pan and/or tilt) and a corresponding operation amount (angle) from the control command, and stores them into the RAM 302.

In step S304, the CPU 401 generates driving parameters for the driving unit 409 based on the operation direction and the operation amount that have been read out in step S303. The CPU 401 may obtain, for example, driving parameters corresponding to the combination of the operation direction and the operation amount with use of a table that has been held in the ROM 403 in advance. Note that in a case where the operation amount is provided in the form of a target value (e.g., a target angle), the CPU 410 obtains driving parameters from the difference from the current value.

In step S305, the CPU 401 controls the driving unit 409 via the driving I/F 408 based on the driving parameters obtained in step S304. As a result, the driving unit 409 is driven in the operation direction designated through the control command by the designated operation amount.

In step S306, the CPU 401 reads out state information included in the state notification command, and stores the same into the RAM 402.

In step S307, the CPU 401 distinguishes the state information stored in the RAM 402. It is assumed here that the state information is one of "distributing", "previewing", and "standing by". Then, the CPU 401 controls the state display unit 412 in accordance with the distinguished state information.

Here, as one example, in a case where the state information is "distributing", the CPU 401 lights the red LED and turns off the green LED. Also, in a case where the state information is "previewing", the CPU 401 lights the green LED and turns off the red LED. Furthermore, in a case where the state information is "standing by", the CPU 401 turns off the red and green LEDs.

Note that the state notification command is not limited to being received via the network I/F 405, and may be received via another communication interface.

(Operations of Switcher 1000)

Figure 4D:
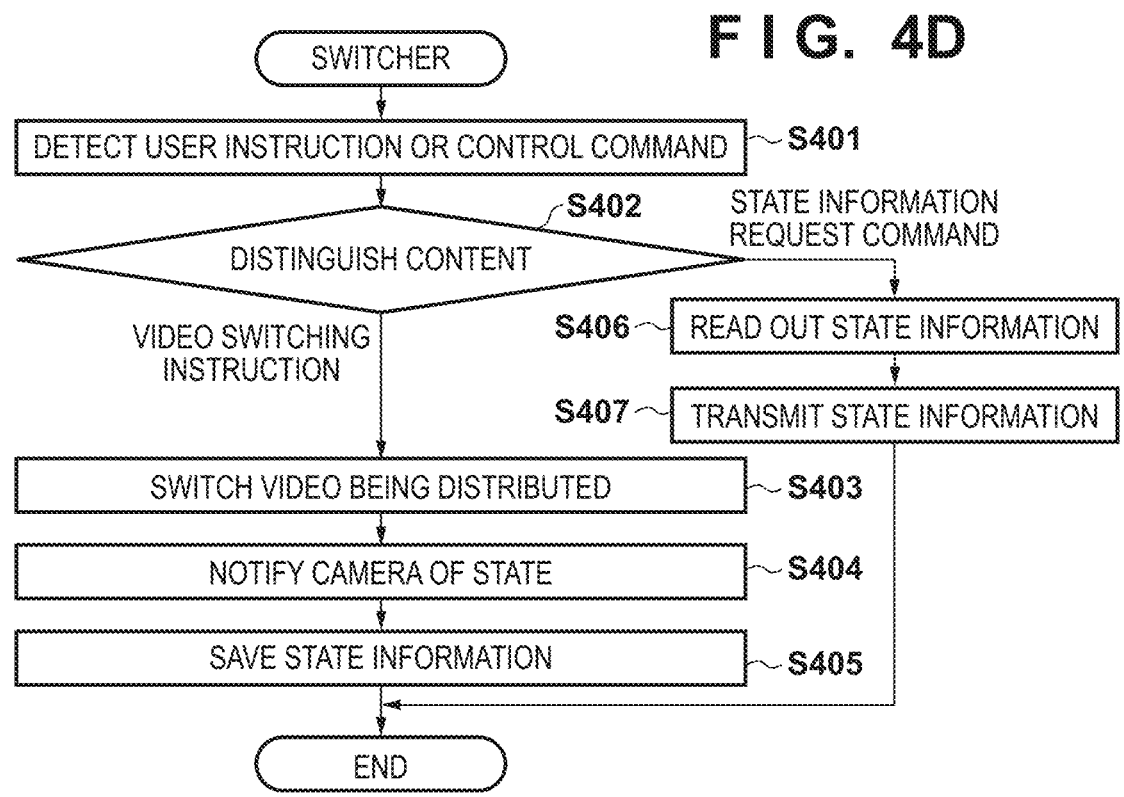

Next, the operations of the switcher 1000 will be described with reference to FIG. 4D. The operations described below are realized by the CPU 1001 executing the program. The following describes operations for a case where the switcher 1000 has detected an instruction for changing (switching) a main video or a preview video via the user input I/F 1006, or a case where it has received a state information request command via the network I/F 1007.

In step S401, the CPU 1001 detects a user instruction or a control command via the user input I/F 1006 or the network I/F 1007.

In step S402, the CPU 1001 distinguishes the content detected in step S401. The CPU 401 executes step S403 in a case where it has been determined that the video switching instruction has been detected via the user input I/F 1006, and step S406 in a case where it has been determined that the state information request command has been received via the network I/F 1007.

The video switching instruction is an instruction for changing a main video (a video to be output from the video output unit 1005) or a preview video (a video that is scheduled to be used as a main video next) among the videos that are supplied to the video input units 1003a to 1003c from the sub cameras 400a to 400c. Note that the main video and the preview video may not be selected. For example, an instruction for changing the main video or the preview video is input as an operation on a display screen for an input video via a mouse or a keyboard connected to the user input I/F 1006.

In step S403, in the case of the instruction for changing the main video, the CPU 1001 switches a video to be supplied to the video output unit 1005 as the main video by controlling the video switch control unit 1004.

Then, in step S404, the CPU 1001 notifies at least a sub camera whose state has been changed of the changed state information. A sub camera whose state has not been changed may not be notified of the state information. The state information is transmitted to the communication network 600 via the network I/F 1007.

Note that instead of giving notice of the state information, the states of the state display units 412 of the sub cameras 400 may be controlled directly from the switcher 1000. In this case, it is necessary for the state display units 412 of the respective sub cameras 400 to be connected to the switcher 1000. As long as the sub cameras 400 can be notified of the state information, a means for this notification is not limited.

In step S405, the CPU 1001 stores, into the RAM 1002, state information STREAMING in which identification information and the state are associated with each other for each sub camera.

In step S406, the CPU 1001 reads out the state information STREAMING stored in the RAM 1002.

In step S407, the CPU 1001 transmits the state information STREAMING to the capture control apparatus 100 via the network I/F 1007.

Note that in a case where an instruction for checking the state information has been detected via the user input I/F 1006, the CPU 401 reads out the state information STREAMING stored in the RAM 1002, and outputs a state information list screen to an external display apparatus via the monitor output unit 1009.

(Operations of Determining on Tracking Target Subject in Consideration of State of Sub Camera)

Next, using a flowchart shown in FIG. 9, a description is given of operations of the capture control apparatus 100 to determine a tracking target subject in consideration of a state of a sub camera 400. The operations shown in FIG. 9 can be executed in place of, for example, step S104 of FIG. 4A.

In step S501, the CPU 101 determines whether the subject of interest has been changed as a result of processing of step S103; step S502 is executed if it has been determined that the subject of interest has been changed, and the processing of the flowchart shown in FIG. 9 is ended if it has not been determined that the subject of interest has been changed.

The CPU 101 stores, into the RAM 102, at least identification information MAIN_SUBJECT of the subject of interest that has been determined most recently. Then, in a case where the subject of interest determined in step S103 is different from the subject of interest that has been determined most recently, the CPU 101 determines that the subject of interest has been changed.

Steps S502 to S506 are executed for each sub camera with which the capture control apparatus 100 can communicate. Information of sub cameras 400 with which the capture control apparatus 100 can communicate can be obtained by the CPU 101 from each of the sub cameras 400a to 400c via the network I/F 105 upon, for example, activation of the capture control apparatus 100. Alternatively, the CPU 101 may obtain information of each of the sub cameras 400a to 400c from the switcher 1000. The CPU 101 stores the obtained information of the sub cameras into the RAM 102.

Instead of obtainment via the network I/F 105, the user may register identification information pieces (e.g., network addresses, serial numbers, and the like) as sub cameras to be controlled with the capture control application. Either way, the CPU 101 is aware of identification information pieces of sub cameras to be controlled, and executes processing of steps S502 to S506 while sequentially switching a target sub camera.

In step S502, the CPU 101 transmits a state information request command to the switcher 1000 via the network I/F 105. The CPU 101 receives the state information STREAMING from the switcher 1000 as a response to the state information request command, and stores the same into the RAM 102. Here, the states of the sub cameras 400a to 400c are collectively obtained from the switcher 1000; however, the states may be obtained individually from the sub cameras 400a to 400c. In this case, the volume of communication between the switcher 1000 and the capture control apparatus 100 can be reduced.

In step S503, the CPU 101 refers to the state information STREAMING stored in the RAM 102, and obtains the state of the sub camera 400 targeted for the processing. Then, the CPU 101 determines whether the state is "distributing". The CPU 101 executes step S504 if the state has been determined to be "distributing", and step S505 if the state has not been determined to be "distributing".

Note that in a case where the state has not been determined to be "distributing", the CPU 101 may further determine whether the state is "previewing", and execute step S505 in a case where the state has not been determined to be "previewing". This can prevent unintended changing of a subject in a video that is scheduled by the operator of the switcher 1000 to be used as a main video next.

In step S504, the CPU 101 provides a notification indicating a subject of interest change refusal (or indicating that the subject of interest is not to be changed), together with the identification information of the sub camera targeted for the processing. The notification may be, for example, a message displayed on the display unit 108.

Also, the CPU 101 may transmit the notification to the outside. For example, the CPU 101 can transmit the notification to the overhead camera 300 via the network I/F 105. Upon receiving the notification via the network I/F 305, the overhead camera 300 displays the subject of interest change refusal on an external display apparatus connected to the monitor output unit 312.

Furthermore, the CPU 101 may transmit, to the overhead camera 300, the result of subject detection performed by the recognition unit 121, the identification information MAIN_SUBJECT of the subject of interest, the identification information SUBJECT_ID of the tracking target subject, and the identification information of the sub camera targeted for the processing, together with the notification.

Then, based on the result of subject detection, the CPU 301 of the overhead camera 300 can output an image obtained by superimposing the identification information of the sub camera targeted for the processing and an indicator (e.g., a rectangular frame) indicating the detected subject on a live-view display image from the monitor output unit 312. Also, the CPU 301 can cause the indicators of the subject of interest and the tracking target subject, among the detected subjects, to be visually different from those of other subjects.

For example, in a case where the subject of interest and the tracking target subject are the same, the indicator is given the color blue, whereas in a case where they are different, the indicators of the subject of interest and the tracking target subject are given the colors green and red, respectively. Furthermore, the indicators of other subjects are not displayed, or given another color, such as white. Note that the colors are merely examples, and visual elements other than colors may vary. In a case where a blue indicator is not displayed but green and red indicators are displayed, it is apparent that changing of the tracking target subject is refused with respect to the sub camera targeted for the processing.

Figure 10A:
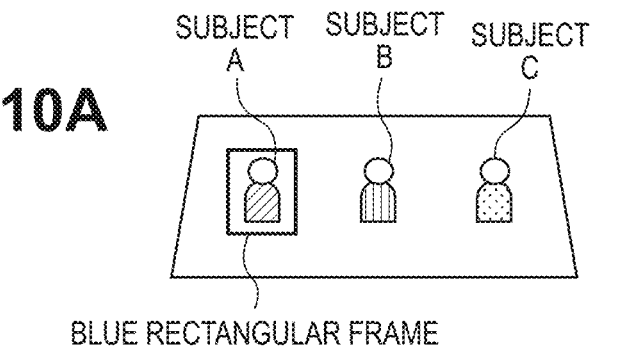
FIGS. 10A to 10C are diagrams showing examples of display of a bounding rectangular frame according to the first embodiment.
Figure 10B:
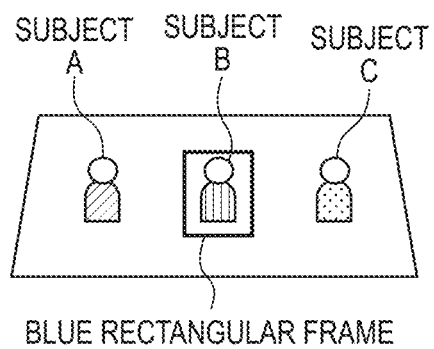
Figure 10C:
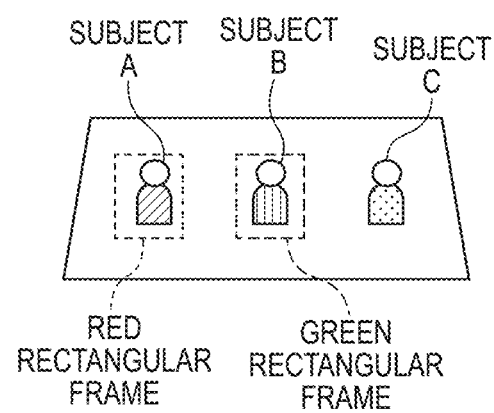

In a case where the subject of interest and the tracking target subject are both subject A with regard to a certain sub camera, the subject A is displayed with a blue indicator (FIG. 10A). It is assumed here that a subject that is neither the subject of interest nor the tracking target subject is not displayed with an indicator. In a case where the subject of interest has been changed to the subject B in this state, if the state of the sub camera is not "distributing" (or is not "previewing"), the new subject of interest becomes the tracking target subject. Therefore, the indicator of the subject A disappears, and the subject B is newly displayed with a blue indicator (FIG. 10B). However, in a case where the state of the sub camera is "distributing" (or "previewing"), the tracking target subject is not changed. Therefore, the indicator of the subject A is changed to red, and the subject B is newly displayed with a green indicator (FIG. 10C).

Note that the CPU 101 may transmit the result of subject detection, the identification information MAIN_SUBJECT of the subject of interest, and the identification information pieces SUBJECT_ID of the tracking target subjects of the respective sub cameras to the overhead camera 300, regardless of a change in the subject of interest. In this way, an external display apparatus connected to the overhead camera 300 can perform the aforementioned display on a continual basis. Also, the sub camera targeted for display may be changed in sequence, for example, at a constant frequency. In this way, in a case where there are a plurality of sub cameras, the tracking target subjects of the respective sub cameras and the subject of interest can be grasped. Furthermore, the display unit 108 may also perform display similar to that of the overhead camera 300.

Note that the notification indicating the tracking target subject change refusal need not necessarily be provided, and the user may be able to set whether the notification is required via the user input I/F 106. In a case where there are a plurality of sub cameras 400, this may be settable on a per-camera basis.

In step S505, the CPU 101 changes the identification information SUBJECT_ID of the tracking target subject of the sub camera targeted for the processing, which is stored in the RAM 102, to the identification information MAIN_SUBJECT of the changed subject of interest. That is to say, the CPU 101 changes the tracking target subject of the sub camera targeted for the processing.

In step S506, the CPU 101 stores the identification information MAIN_SUBJECT of the subject of interest into the RAM 102.

Once processing of steps S502 to S506 has been executed with respect to each of the sub cameras 400a to 400c to be controlled, the CPU 101 ends the processing shown in the flowchart of FIG. 9. The CPU 101 subsequently executes step S105 of FIG. 4A.

Note, regarding a sub camera for which changing of the tracking target subject has been refused, a change may be made so that the subject of interest is set as the tracking target subject if the sub camera has changed to a state where the tracking target subject can be changed when step S104 of FIG. 4A is executed from the next time onward. Specifically, regarding a sub camera whose tracking target subject is different from the subject of interest in a state where the tracking target subject can be changed, the CPU 101 can make a change so that the subject of interest is set as the tracking target subject.

As described above, in a case where a sub camera to be automatically controlled so as to track and capture a specific subject is in the state "distributing" (i.e., in a case where the selection has been made by the switcher 1000), the capture control apparatus 100 of the present embodiment does not change the tracking target subject even if the specific subject has been changed. This can prevent a subject in a main video from being changed to a subject that is against the intention of the operator of the switcher 1000. Furthermore, with regard to a sub camera in the state "previewing" as well, the tracking target subject is not changed even if the specific subject has been changed; this can also prevent a subject that is scheduled to be in a main video next from being changed to a subject that is against the intention of the operator of the switcher 1000.

The capture control apparatus 100 of the present embodiment can realize the advantageous effect of preventing an unintentional change in a subject in a main video while allowing image capture to be easily performed using a plurality of sub cameras with a small number of staff.

Modification Example

Note that in step S104 of FIG. 4A, the tracking target subject determination unit 123 (CPU 101) may determine a tracking target subject of a target sub camera 400 based on a role set on the sub camera 400.

How to use information obtained from a main camera in controlling the operations of a sub camera 400 is determined in advance in relation to a role that can be set on the sub camera 400. It is assumed here that information of the main camera is used in controlling a tracking target subject and a zoom operation of the sub camera 400 as one example. Note that the main camera is a camera different from the overhead camera 300; the main camera may be provided separately from the sub cameras, or one of the plurality of sub cameras may be assigned as the main camera. In a case where the main camera is provided separately from the sub cameras, it is sufficient that the main camera be a camera whose image capture is not controlled by the capture control apparatus 100 (operated by a photographer). In a case where the main camera is provided, for example, the user registers identification information of the main camera and the roles to be set on the respective sub cameras with the capture control application via the user input I/F 106.

A tracking target subject of the main camera may be determined by the capture control apparatus 100, or may be determined from a video of the main camera input to the capture control apparatus 100, similarly to the overhead camera 300. The CPU 101 can determine the tracking target subject of the main camera using, for example, a known main subject determination method. For example, the CPU 101 can specify identification information of the tracking target subject by identifying a subject region closest to the center of the image.

Also, the CPU 101 can determine a zoom operation of the main camera and the phase thereof by, for example, detecting a change in the angle of view of the video of the main camera. For example, the change in the angle of view may be detected from the sizes of the subject regions, a temporal change in an interval therebetween, and the like. Alternatively, the CPU 101 may detect a zoom operation of the main camera and the phase thereof by cyclically obtaining information of the angle of view from the main camera.

Figures 13, 14:
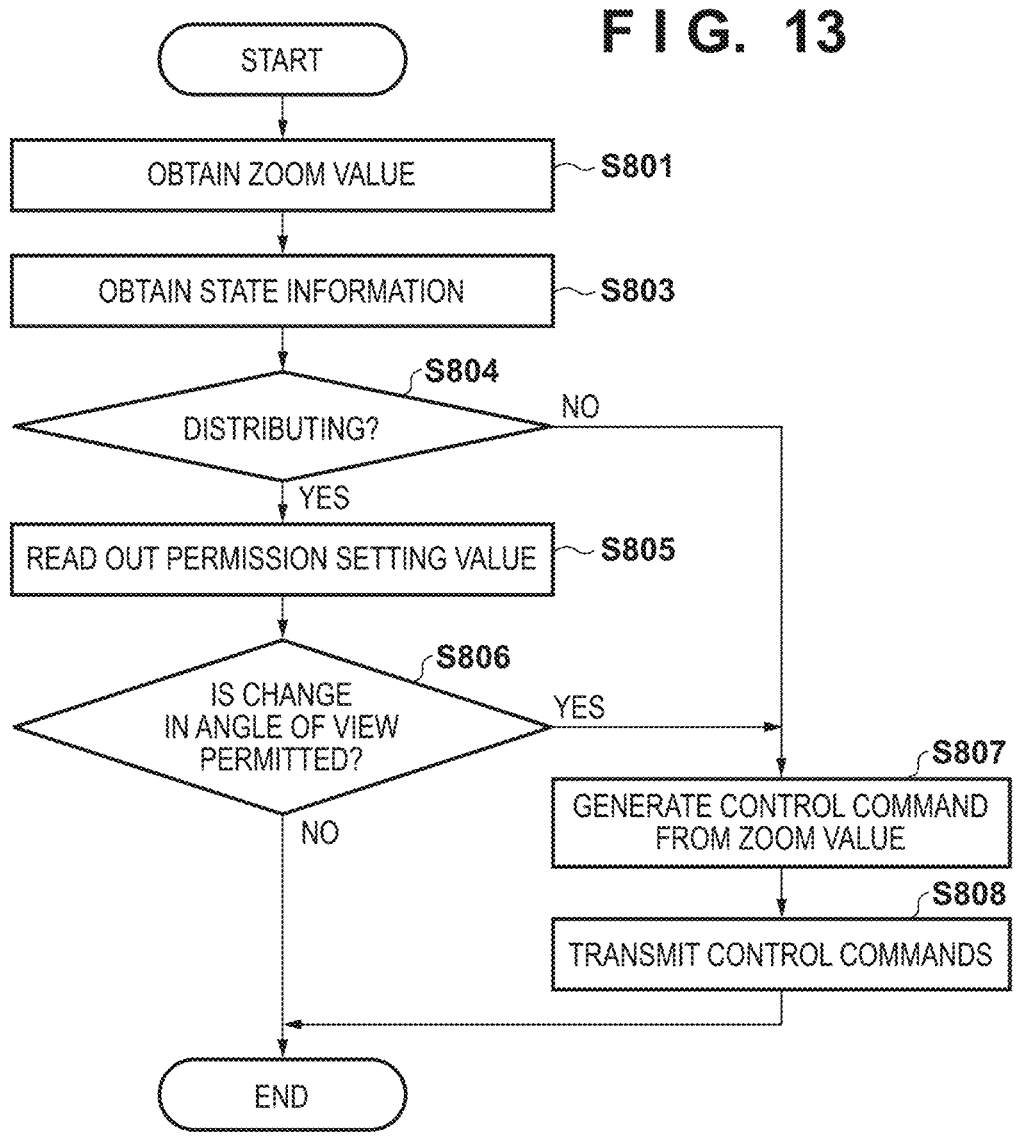
FIG. 13 is a flowchart related to the operations of the capture control apparatus according to a third embodiment.
FIG. 14 is a diagram showing examples of roles that can be set on a sub camera in an embodiment.

FIG. 14 shows examples of the types of roles that can be set on a sub camera 400, and the corresponding contents of control. It is assumed here that one of "main follow", "main counter", "assist follow", and "assist counter" can be set as a role (ROLE).

With respect to the sub camera 400 whose role (ROLE) is "main follow", the capture control apparatus 100 (CPU 101) sets the same tracking target subject as the main camera, and also performs in-phase zoom control on the sub camera 400 when a zoom operation has been performed on the main camera. Here, in-phase means that the zoom direction (telephoto direction or wide-angle direction) is the same, that is to say, the direction of change in the angle of view is the same. On the other hand, antiphase means that the zoom direction (telephoto direction or wide-angle direction) is the opposite direction, that is to say, the direction of change in the angle of view is the opposite direction. Note that the angle of view may not be the same as that of the main camera 500 even if the zoom direction is in-phase, and the degree of change in zooming (the speed of change, the rate of change, or the like) may not be the same as that of the main camera 500 whether the zoom direction is in-phase or antiphase.

With respect to the sub camera whose role (ROLE) is "main counter", the capture control apparatus 100 (CPU 101) sets the same tracking target subject as the main camera, and also performs antiphase zoom control on the sub camera when a zoom operation has been performed on the main camera. Therefore, in a case where a zoom-in operation has been performed on the main camera, the capture control apparatus 100 (CPU 101) controls the sub camera of this role to zoom out. Note that to zoom in means to switch to zooming in the telephoto direction (the direction toward the telephoto end), whereas to zoom out means to switch to zooming in the wide-angle direction (the direction toward the wide-angle end). In a case where zoom control is performed by the image processing unit 406, to zoom in means to reduce a region to be cut out from an image and increase the enlargement factor of the cut-out region compared to that before changing the region. On the other hand, to zoom out means to increase a region to be cut out from an image and reduce the enlargement factor of the cut-out region compared to that before changing the region.

With respect to the sub camera whose role (ROLE) is "assist follow", the capture control apparatus 100 (CPU 101) sets a tracking target subject different from that of the main camera, and also performs in-phase zoom control on the sub camera when a zoom operation has been performed on the main camera.

With respect to the sub camera whose role (ROLE) is "assist counter", the capture control apparatus 100 (CPU 101) sets a tracking target subject different from that of the main camera, and also performs antiphase zoom control on the sub camera when a zoom operation has been performed on the main camera.

Here, with respect to the sub camera 400 whose role (ROLE) is "assist follow" or "assist counter", a subject located on the left side among the subjects other than a tracking target subject of the main camera in an image is set as a tracking target subject of the sub camera 400. Note that the tracking target subject of the sub camera 400 may be set in accordance with other conditions. For example, a subject that is located on the right side, the upper side, or the lower side among the subjects other than a tracking target subject of the main camera in an image may be set as the tracking target subject of the sub camera.

Alternatively, a subject that is located nearest to the front or the back among the subjects other than a tracking target subject of the main camera may be set as the tracking target subject of the sub camera 400.

Furthermore, only one of the setting of the tracking target subject and zoom control may be executed, and another control item may be further added.

Second Embodiment

Next, a second embodiment of the present invention will be described. The present embodiment may be similar to the first embodiment, except for the operations of the capture control apparatus 100 to determine a tracking target subject. Therefore, a description of configurations and operations of apparatuses that are the same as those of the first embodiment is omitted.

Figure 11:
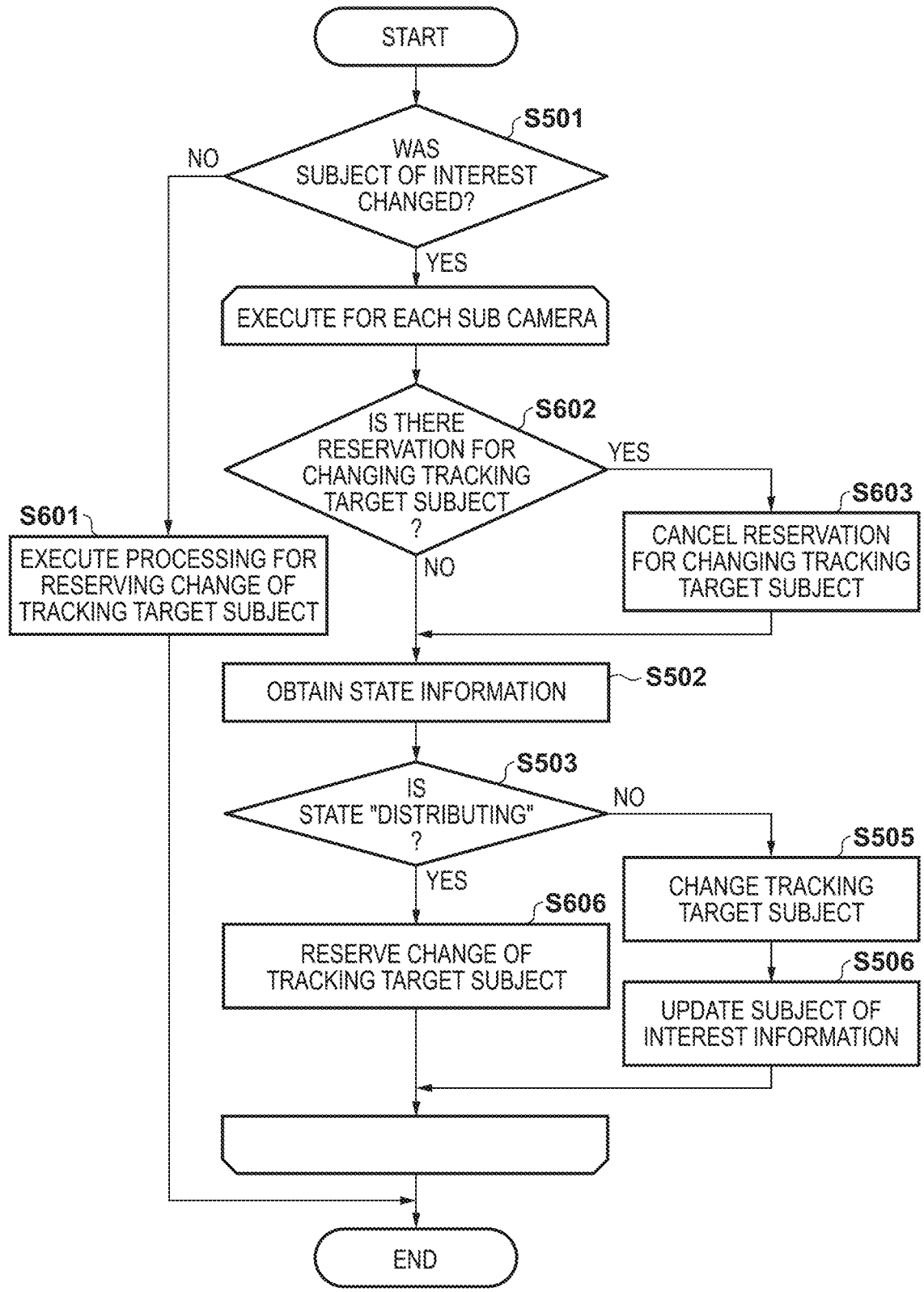
FIG. 11 is a flowchart related to the operations of the capture control apparatus according to a second embodiment.

Using a flowchart shown in FIG. 11, the following describes the operations of the capture control apparatus 100 to determine a tracking target subject according to the present embodiment. The operations shown in FIG. 11 can be executed in place of, for example, step S104 of FIG. 4A. Furthermore, processes that are the same as those of the first embodiment are given the same reference numerals as FIG. 9, and a description thereof is omitted.

In step S501, the CPU 101 determines whether the subject of interest has been changed as a result of processing of step S103; step S602 is executed if it has been determined that the subject of interest has been changed, and step S601 is executed if it has not been determined that the subject of interest has been changed.

In step S601, the CPU 101 executes processing for reserving a change in a tracking target subject. The details of this processing will be described later. Once the processing for reserving a change in a tracking target subject has finished, the CPU 101 ends the processing of the flowchart shown in FIG. 11.

In step S602, the CPU 101 determines whether a reservation for subject change is stored in the RAM 102. The reservation for subject change will be described later. The CPU 101 executes step S603 if it has been determined that the reservation for subject change is stored in the RAM 102, and step S502 if it has not been thus determined.

In step S603, the CPU 101 deletes the reservation for subject change stored in the RAM 102. This is because the subject of interest has been changed since the time when the reservation was stored. Thereafter, the CPU 101 executes step S502.

Thereafter, the CPU 101 executes processing similar to that of the first embodiment, except that step S606 is executed in place of step S504 in a case where it has been determined in step S503 that the state of the sub camera targeted for the processing is "distributing". In the present embodiment also, in the case of the state "previewing", processing similar to that executed in the state "distributing" may be executed.

In step S606, the CPU 101 includes the identification information MAIN_SUBJECT of the subject of interest, which has been determined in step S103, in the reservation for change in the tracking target subject, and stores the reservation into the RAM 102.

Figure 12:
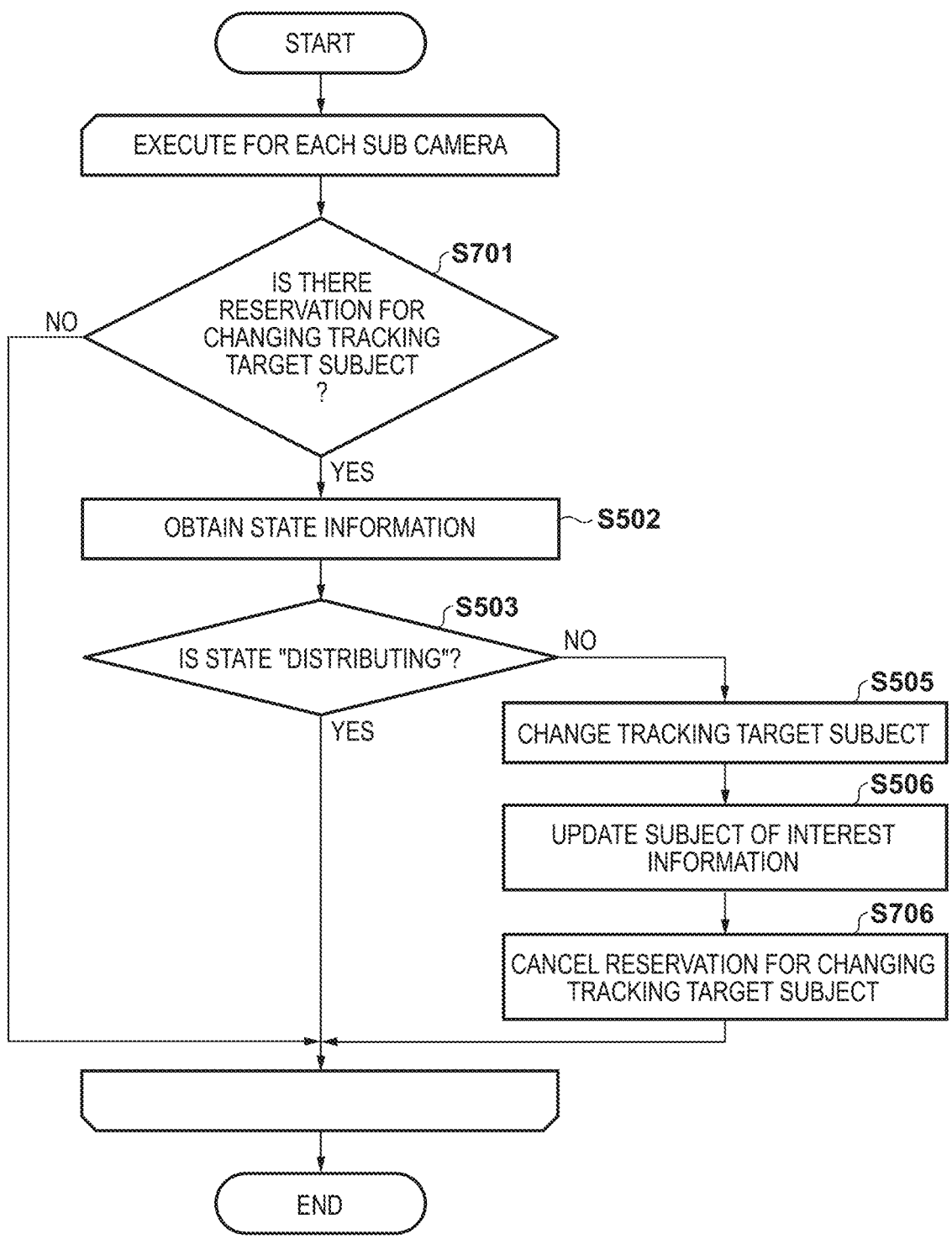
FIG. 12 is a flowchart related to the operations of the capture control apparatus according to the second embodiment.

Next, using a flowchart shown in FIG. 12, the details of processing for reserving a change in a tracking target subject, which is executed in step S601 of FIG. 11, will be described. In FIG. 12, processes that are the same as those of the first embodiment are given the same reference numerals as FIG. 9, and a description thereof is omitted. Note that the processing for reserving a change in a tracking target subject may be executed at an arbitrary timing different from the timing of execution of step S104 of FIG. 3. The processing for reserving a change in a tracking target subject is executed for each sub camera.

In step S701, the CPU 101 determines whether a reservation for a change in a tracking target subject is stored in the RAM 102. The reservation for subject change will be described later. The CPU 101 executes step S502 if it has been determined that the reservation for subject change is stored in the RAM 102, and changes the sub camera targeted for the processing and executes step S701 if it has not been thus determined. If there is no sub camera for which step S701 has not been executed, the CPU 101 ends the processing shown in the flowchart of FIG. 12.

In step S502, the CPU 101 obtains state information of the sub camera targeted for the processing. The state information may be obtained directly from the sub camera, or the state information STREAMING may be obtained from the switcher 1000. In a case where the state information STREAMING has been obtained from the switcher 1000, as it includes state information of every sub camera, step S502 need not be executed with respect to the remaining sub cameras.

Steps S503, S505, and S506 are similar to those of the first embodiment. In step S505, with regard to the sub camera for which changing of a tracking target subject has been refused when a subject of interest was changed previously, as the state has been changed from "distributing" (the selection is no longer made by the switcher 1000), the tracking target subject is changed to the latest subject of interest. After step S506, the CPU 101 executes step S706.

In step S706, the CPU 101 deletes the reservation for subject change stored in the RAM 102. Then, the CPU 101 changes the target sub camera, and executes step S701. If there is no sub camera for which step S701 has not been executed, the CPU 101 ends the processing shown in the flowchart of FIG. 12.

According to the present embodiment, with regard to a sub camera for which changing of a tracking target subject has been refused, the tracking target subject is changed automatically upon entering a state where the tracking target subject can be changed; therefore, the advantageous effect of offering convenience can be realized in addition to the advantageous effects similar to those of the first embodiment.

Third Embodiment

Next, a third embodiment of the present invention will be described. The present embodiment is related to control performed by the capture control apparatus 100 on an angle of view of a sub camera 400. The capture control apparatus 100 can change the angle of view by transmitting a control command to the sub camera 400. For example, in a case where an instruction for changing the angle of view of the sub camera 400 has been received from a non-illustrated external apparatus in the communication network 600, there is a risk of a change in the angle of view that is against the intention of the operator of the switcher 1000.

The capture control apparatus 100 of the present embodiment prevents a change in an angle of view that is not intended by the operator of the switcher 1000 with respect to a sub camera that is currently capturing a main video.

Upon receiving a zoom command via the network I/F 105, the CPU 101 of the capture control apparatus 100 executes processing shown in a flowchart of FIG. 13.

In step S801, the CPU 101 stores the received zoom command into the RAM 102. It is assumed here that the zoom command includes identification information of a target sub camera and zoom position information. Then, the CPU 101 obtains the zoom position information from the zoom command.

The zoom position changes between the wide-angle end and the telephoto end, thereby allowing the angle of view to be changed. For example, the zoom position information indicates the number of steps in a stepper motor that drives a zoom lens, and the zoom position changes between steps "0" to "300". Here, the zoom position information may be, for example, a focal length (mm) of the image capture optical system corresponding to a full-size 35-mm image sensor; in this case, a zoom value representing the zoom position information on the telephoto side is larger than a zoom value representing the zoom position information on the wide-angle side. Note that the zoom command may include a zoom-in or zoom-out instruction in place of the zoom position information that uniquely indicates the angle of view. The zoom-in or zoom-out instruction is an instruction for changing the current angle of view by an angle of view of a certain magnitude. It is assumed that the certain magnitude is determined in advance based on, for example, a unit of zoom driving in the driving unit or a unit of control on a digital zoom magnification factor.

In step S803, the CPU 101 obtains the state information STREAMING from the switcher 1000, and stores the same into the RAM 102. Note that state information may be obtained from the sub camera 400 individually.

In step S804, the CPU 101 refers to the state information STREAMING stored in the RAM 102, and obtains the state of the sub camera 400 designated through the zoom command. Then, the CPU 101 determines whether the state is "distributing". The CPU 101 executes step S805 if the state has been determined to be "distributing", and step S807 if the state has not been determined to be "distributing".

In step S805, the CPU 101 reads out, from the RAM 102, a setting value (permission setting value) indicating whether changing of the angle of view of the sub camera that is currently capturing a main video (a video that is currently output from the switcher 1000) (or changing of the angle of view of the main video) is permitted. It is assumed that the permission setting value has been set in advance.

Note that when the zoom command has been received, data of a setting screen may be transmitted to the switcher 1000, and the operator of the switcher 1000 may set the permission setting value. Upon receiving the permission setting value from the switcher 1000 via the network I/F 105, the CPU 101 stores the permission setting value into the RAM 102.

The CPU 101 refers to the permission setting value, and executes step S807 if it has been determined that changing of the angle of view of the main video is permitted, and ends the processing shown in the flowchart of FIG. 13 if it has not been thus determined. In this way, if it has not been determined that changing of the angle of view of the main video is permitted, the zoom command is not executed. In this case, the CPU 101 may notify the external apparatus that has transmitted the zoom command of the fact that zooming is not permitted.

In step S807, the CPU 101 generates a control command for the designated sub camera 400 based on the zoom position information, and stores the same into the RAM 102.

In step S808, the CPU 101 reads out the control command from the RAM 102, and transmits the same to the designated sub camera 400 via the network I/F 105.

The capture control apparatus 100 of the present embodiment can control whether to permit changing of the angle of view of a sub camera that is capturing a main video (or changing of the angle of view of the main video). Also, in a case where the capture control apparatus 100 has received an instruction for changing the angle of view with respect to the sub camera that is capturing the main video, it changes the angle of view only when changing of the angle of view is permitted. This can prevent changing of the angle of view of the main video that is against the intention of the operator of the switcher.

Note that control is not limited to being performed on the angle of view; parameters which affect a video of a sub camera 400 and which can be controlled by the capture control apparatus 100 (e.g., a focusing distance, an exposure condition, and the like) can also be controlled similarly to changing of the angle of view. Furthermore, the permission setting value can be set on a per-parameter basis.

Other Embodiments

The above embodiments have been described in relation to a configuration in which the capture control apparatus 100 is an independent apparatus. However, another apparatus (e.g., the switcher 1000 or the sub cameras 400) may have the functions similar to those of the capture control apparatus 100.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-145576, filed Sep. 7, 2023, which is hereby incorporated by reference herein in its entirety.

What is claimed is:

1. A capture control apparatus, comprising:
one or more processors that execute a program stored in a memory and thereby function as:
an identification unit configured to identify subjects within a captured area based on a video of the captured area;
a first determination unit configured to determine a subject of interest based on a predetermined criterion from among the identified subjects;
a second determination unit configured to determine a tracking target subject of the camera based on the subject of interest, wherein the second determination unit;
while a video captured by the camera is selected as a specific video by an external selection apparatus, does not change the tracking target even if the subject of interest has changed, and
if the video captured by the camera is not selected as the specific video by the selection apparatus, changes the tracking target subject in response to a change of the subject of interest; and
a control unit configured to control a capture direction of a camera so as to track and capture the tracking target subject,
wherein the capture control apparatus causes a display apparatus to display a video obtained by superimposing indicators on a video of the captured area, the indicators indicating the subject of interest and the tracking target subject, and
appearances of the indicators vary between a case where the subject of interest and the tracking target subject are the same and a case where the subject of interest and the tracking target subject are different.

2. The capture control apparatus according to claim 1, wherein
the specific video is a video that is output by the selection apparatus.

3. The capture control apparatus according to claim 1, wherein
the specific video is a video that is output by the selection apparatus, or a video that is scheduled to be output by the selection apparatus next.

4. The capture control apparatus according to claim 1, wherein
in a case where the video captured by the camera is not selected as the specific video by the selection apparatus, the second determination unit is allowed to determine another subject than the tracking target subject from among the identified subjects as the tracking target subject.

5. The capture control apparatus according to claim 1, wherein
the second determination unit determines the tracking target subject based on a tracking target subject of another camera which captures the captured area and which is different from the camera, as an alternative of the subject of interest.

6. The capture control apparatus according to claim 5, wherein
the control unit controls an angle of view of the camera in accordance with an angle of view of the other camera which captures the captured area and which is different from the camera.

7. The capture control apparatus according to claim 6, wherein
how to use the tracking target subject of the other camera and the angle of view of the other camera in controlling the camera varies depending on a type of a role set on the camera.

8. The capture control apparatus according to claim 1, wherein
the subject of interest is determined by a user of the capture control apparatus.

9. The capture control apparatus according to claim 1, wherein
the subject of interest is determined by the capture control apparatus.

10. The capture control apparatus according to claim 1, wherein
the video of the captured area is a video obtained by capturing an entirety of the captured area in a fixed direction and a fixed angle of view.

11. The capture control apparatus according to claim 1, wherein
the video obtained by capturing the captured area is a video captured by another camera that is not controlled by the capture control apparatus, the other camera being different from the camera.

12. The capture control apparatus according to claim 1, wherein
in a case where the tracking target subject has not been changed when the subject of interest has changed because the video captured by the camera has been selected as the specific video by the selection apparatus, the second determination unit determines a latest subject of interest as the tracking target subject after the video captured by the camera is no longer selected as the specific video by the selection apparatus.

13. The capture control apparatus according to claim 1, wherein
when receiving an instruction for a change that affects the video of the camera while the video captured by the camera is selected as the specific video by the selection apparatus, the control unit does not execute the instruction if the change is not permitted.

14. The capture control apparatus according to claim 13, wherein
the change that affects the video of the camera is a change in one of an angle of view, a focusing distance, and an exposure condition of the camera.

15. A capture control method executed by a capture control apparatus, the capture control method comprising:
identifying subjects within a captured area based on a video of the captured area;
determining a subject of interest based on a predetermined criterion from among the identified subjects;
determining a tracking target subject of the camera based on the subject of interest, wherein the determining includes
while a video captured by the camera is selected as a specific video by an external selection apparatus, not changing the tracking target even if the subject of interest has changed, and
if the video captured by the camera is not selected as the specific video by the selection apparatus, changing the tracking target subject in response to a change of the subject of interest;
controlling a capture direction of a camera so as to track and capture the tracking target subject; and
causing a display apparatus to display a video obtained by superimposing indicators on a video of the captured area, the indicators indicating the subject of interest and the tracking target subject, and
wherein appearances of the indicators vary between a case where the subject of interest and the tracking target subject are the same and a case where the subject of interest and the tracking target subject are different.

16. An image capture system, comprising:
a capture control apparatus;
one or more cameras whose image capture is controlled by the capture control apparatus;
a selection apparatus; and
a communication network via which the capture control apparatus, the cameras, and the selection apparatus are connected in a communication-enabled manner,
wherein the capture control apparatus comprises:
one or more processors that execute a program stored in a memory and thereby function as:
an identification unit configured to identify subjects within a captured area based on a video of the captured area;
a first determination unit configured to determine a subject of interest based on a predetermined criterion from among the identified subjects;
a second determination unit configured to determine a tracking target subject of the camera based on the subject of interest, wherein the second determination unit
while a video captured by the camera is selected as a specific video by the selection apparatus, does not change the tracking target even if the subject of interest has changed, and
if the video captured by the camera is not selected as the specific video by the selection apparatus, changes the tracking target subject in response to a change of the subject of interest; and
a control unit configured to control a capture direction of a camera so as to track and capture the tracking target subject, wherein the capture control apparatus causes a display apparatus to display a video obtained by superimposing indicators on a video of the captured area, the indicators indicating the subject of interest and the tracking target subject, and wherein appearances of the indicators vary between a case where the subject of interest and the tracking target subject are the same and a case where the subject of interest and the tracking target subject are different.

17. A non-transitory computer-readable medium storing a program for causing a computer to perform a capture control method comprising:

identifying subjects within a captured area based on a video of the captured area;

determining a subject of interest based on a predetermined criterion from among the identified subjects;

determining a tracking target subject of the camera based on the subject of interest, wherein the determining includes while a video captured by the camera is selected as a specific video by an external selection apparatus, not changing the tracking target even if the subject of interest has changed, and if the video captured by the camera is not selected as the specific video by the selection apparatus, changing the tracking target subject in response to a change of the subject of interest;

controlling a capture direction of a camera so as to track and capture the tracking target subject and causing a display apparatus to display a video obtained by superimposing indicators on a video of the captured area, the indicators indicating the subject of interest and the tracking target subject, and wherein appearances of the indicators vary between a case where the subject of interest and the tracking target subject are the same and a case where the subject of interest and the tracking target subject are different.

* * * * *